(12) United States Patent
Na et al.

(10) Patent No.: US 11,853,897 B2
(45) Date of Patent: *Dec. 26, 2023

(54) NEURAL NETWORK TRAINING WITH DECREASED MEMORY CONSUMPTION AND PROCESSOR UTILIZATION

(71) Applicant: Microsoft Technology Licensing, LLC, Redmond, WA (US)

(72) Inventors: Taesik Na, Issaquah, WA (US); Daniel Lo, Bothell, WA (US); Haishan Zhu, Bellevue, WA (US); Eric Sen Chung, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,190

(22) Filed: Dec. 9, 2022

(65) Prior Publication Data

US 2023/0110219 A1 Apr. 13, 2023

Related U.S. Application Data

(63) Continuation of application No. 16/550,229, filed on Aug. 24, 2019, now Pat. No. 11,526,761.

(51) Int. Cl.
*G06N 3/084* (2023.01)

(52) U.S. Cl.
CPC .................... *G06N 3/084* (2013.01)

(58) Field of Classification Search
CPC ............ G06N 3/02; G06N 3/08; G06N 3/084
See application file for complete search history.

(56) References Cited

U.S. PATENT DOCUMENTS

| | | | | |
|---|---|---|---|---|
| 10,713,568 B2* | 7/2020 | Liu | ....................... | G06N 3/084 |
| 11,074,502 B2* | 7/2021 | Baker | ..................... | G06N 3/082 |
| 11,094,029 B2* | 8/2021 | Kalamkar | .................. | G06T 1/20 |
| 11,151,455 B2* | 10/2021 | Baker | ................... | H04L 67/142 |
| 11,270,201 B2* | 3/2022 | Sridharan | ............. | G06F 9/5077 |
| 11,328,208 B2* | 5/2022 | Lie | .......................... | G06N 3/084 |
| 11,373,088 B2* | 6/2022 | Bleiweiss | .............. | G06N 3/063 |
| 11,488,004 B2* | 11/2022 | Lie | .......................... | G06N 3/08 |
| 11,526,761 B2* | 12/2022 | Na | ......................... | G06N 3/084 |

* cited by examiner

*Primary Examiner* — Hosuk Song
(74) *Attorney, Agent, or Firm* — Alleman Hall Creasman & Tuttle LLP

(57) ABSTRACT

Bounding box quantization can reduce the quantity of bits utilized to express numerical values prior to the multiplication of matrices comprised of such numerical values, thereby reducing both memory consumption and processor utilization. Stochastic rounding can provide sufficient precision to enable the storage of weight values in reduced-precision formats without having to separately store weight values in a full-precision format. Alternatively, other rounding mechanisms, such as round to nearest, can be utilized to exchange weight values in reduced-precision formats, while also storing weight values in full-precision formats for subsequent updating. To facilitate conversion, reduced-precision formats such as brain floating-point format can be utilized.

20 Claims, 16 Drawing Sheets

NEURAL NETWORK TRAINING WITH DECREASED MEMORY CONSUMPTION AND PROCESSOR UTILIZATION

CROSS REFERENCE TO RELATED APPLICATIONS

This application is a continuation of U.S. patent application Ser. No. 16/550,229, filed Aug. 24, 2019, the entirety of which is hereby incorporated herein by reference for all purposes.

BACKGROUND

The ubiquity of massive parallel processing capabilities has facilitated the widespread adoption and utilization of artificial neural networks, which are computing systems that utilize derived parameters to perform functions that were not directly programmed. Instead, training data is utilized to derive appropriate parameters, which can then facilitate the performance of a required function. For example, a neural network can derive parameters, typically referred to as "weights", which can enable computing devices to distinguish between images that comprise, for example, a stop sign, and images that do not. The derivation of the weight values is commonly referred to as "training" the neural network. In the above example, training such a neural network to recognize stop signs in images can comprise providing access to images that are identified as comprising stop signs, as well as images that are identified as not comprising stop signs. Iterative training is then performed to derive appropriate weight values which can then be utilized to recognize whether or not a subsequent input image does, or does not, comprise a stop sign.

Typically, neural networks comprise computationally intensive operations that are distributed in parallel across many processors. Such operations can include matrix multiplication, gradient descent mechanisms, and other like operations. Moreover, such operations are typically performed on large quantities of numerical values, which are expressed in standard formats where a single value is represented by thirty-two bits or more of data. Due to the large quantities of numerical values, the storage of such numerical values may require hundreds of gigabytes, or even terabytes of data storage capacity. Additionally, the processing of such numerical values, such as the matrix multiplication thereof, can consume significant processing capabilities. However, merely reducing the precision of the format in which such numerical values are represented, such as, for example, by representing numerical values utilizing only eight bits of data, instead of thirty-two bits, provides insufficient precision. Thus, while such a reduction in precision can decrease memory consumption and processor utilization, it fails to provide sufficient precision to enable the operations to complete properly. For example, when training a neural network, iterative processing converges upon weight values that are to be subsequently utilized by the neural network to perform an evaluation. Insufficient precision in the format utilized to represent values can result in the weight values failing to converge, and, consequently, the neural network failing to be trained.

SUMMARY

Bounding box quantization can reduce the quantity of bits utilized to express numerical values prior to the multiplication of matrices comprised of such numerical values, thereby reducing both memory consumption and processor utilization. Stochastic rounding can provide sufficient precision to enable the storage of weight values in reduced-precision formats without having to separately store weight values in a full-precision format. Alternatively, other rounding mechanisms, such as round to nearest, can be utilized to exchange weight values in reduced-precision formats, while also storing weight values in full-precision formats for subsequent updating. To facilitate the conversion of the representation of numerical values in full-precision formats to reduced-precision formats, reduced-precision formats such as brain floating-point format can be utilized which can comprise a same quantity of bits utilized to represent an exponential value as a full-precision format, thereby making such conversion as simple as discarding the least significant bits of the significand. Similarly, to the extent that existing processes are utilized that consume numerical values expressed in full-precision formats, upconversion to such full-precision formats, including by bit padding reduced-precision formats, can be performed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
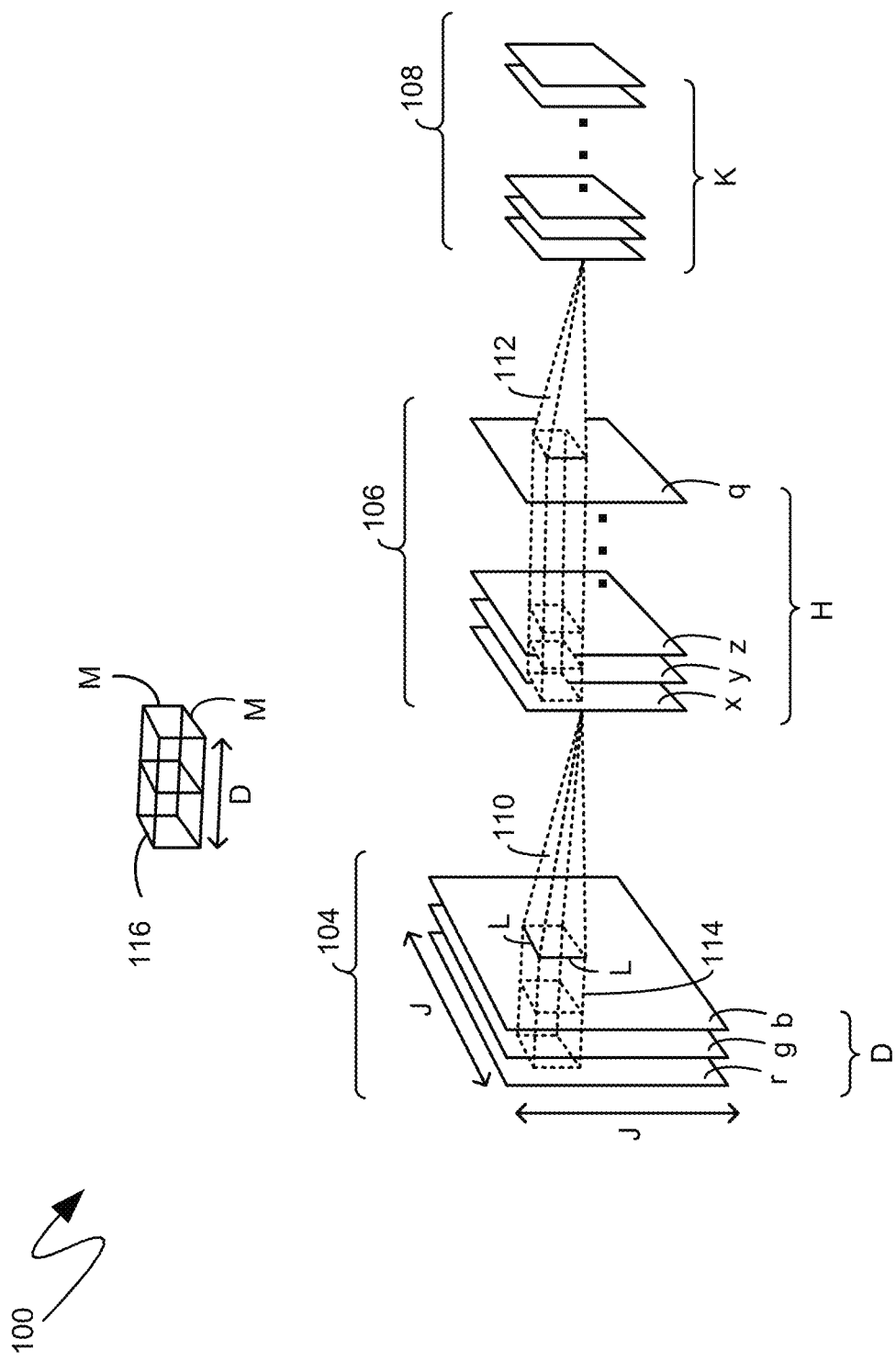
FIG. 1 is a system diagram of an exemplary convolution performed by a neural network.

The following description relates to the successful training of neural networks utilizing values expressed in reduced-precision format, thereby decreasing the memory and storage utilization and processor consumption during such training. Bounding box quantization can reduce the quantity of bits utilized to express numerical values prior to the multiplication of matrices comprised of such numerical values, thereby reducing both memory consumption and processor utilization. Stochastic rounding can provide sufficient precision to enable the storage of weight values in reduced-precision formats without having to separately store weight values in a full-precision format. Alternatively, other rounding mechanisms, such as round to nearest, can be utilized to exchange weight values in reduced-precision formats, while also storing weight values in full-precision formats for subsequent updating. To facilitate the conversion of the representation of numerical values in full-precision formats to reduced-precision formats, reduced-precision formats such as brain floating-point format can be utilized which can comprise a same quantity of bits utilized to represent an exponential value as a full-precision format, thereby making such conversion as simple as discarding the least significant bits of the significand. Similarly, to the extent that existing processes are utilized that consume numerical values expressed in full-precision formats, upconversion to such full-precision formats, including by bit padding reduced-precision formats, can be performed.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Prior to detailing mechanisms by which neural network training can be accomplished more efficiently, with decreased memory consumption and decreased processor utilization, a general overview of neural network operations and the training thereof is provided to act as context for the descriptions below. Neural networks, including deep neural networks (DNNs) and convolution neural networks (CNNs), can achieve high accuracy on human recognition tasks such as image and speech recognition. Neural networks may include a number of different processing "layers", including linear layers and convolutional layers. Outputs of convolutional layers may be processed with "pooling" operations which subsample the convolved output, and non-linearization steps, such as sigmoid or tanh applied to the output. FIG. 1 is a simplified diagram depicting a three-dimensional (3D) CNN 100 that includes three exemplary 3D volumes, namely the exemplary volumes 104, 106, 108. Each 3D volume 104, 106, 108 can represent an input to a layer, and can transformed into a new 3D volume feeding a subsequent layer. In the example of FIG. 1, there are two convolutional layers, namely the exemplary convolution layers 110 and 112. Volume 104, with 3 planes, can be an input to convolutional layer 110, which can generate volume 106, with H planes, which, in turn, can be an input to convolutional layer 112, which can generate volume 108, with K planes.

For example, volume 104 can include image data in three planes, such as the well-known "red", "green" and "blue" layers of a color image. Each plane can include a two-dimensional array of data. For example, if the exemplary volume 104 was a portion of an image, then the portion could be, for example, one-hundred pixels wide by one-hundred pixels high. In such an instant, the variable "J", shown in FIG. 1, can be a value of one-hundred. More or fewer than three planes may be used, and each plane need not include a square array. Additionally, data other than image data may be used.

A 3D input volume, such as the exemplary input volume 114, can be convolved with weight kernels. For example, as shown in FIG. 1, the exemplary input volume 114 can be of dimensions L×L×D, where D is three in the present example. Such an exemplary input volume can be convolved with kernel weights, such as the exemplary kernel weights 116, which can also have a dimension of L×L×D, with, again, the dimension D being three in the present example. Each kernel weight can shifted in a sliding-window-like fashion across the input volume, such as the exemplary volume 104. A stride value can define an amount of such a shift offset. During each shift, each weight in to the 3D kernel weight is multiplied and added with corresponding pair-wise input elements from the overlapping region of input volume 114.

Figure 2A:
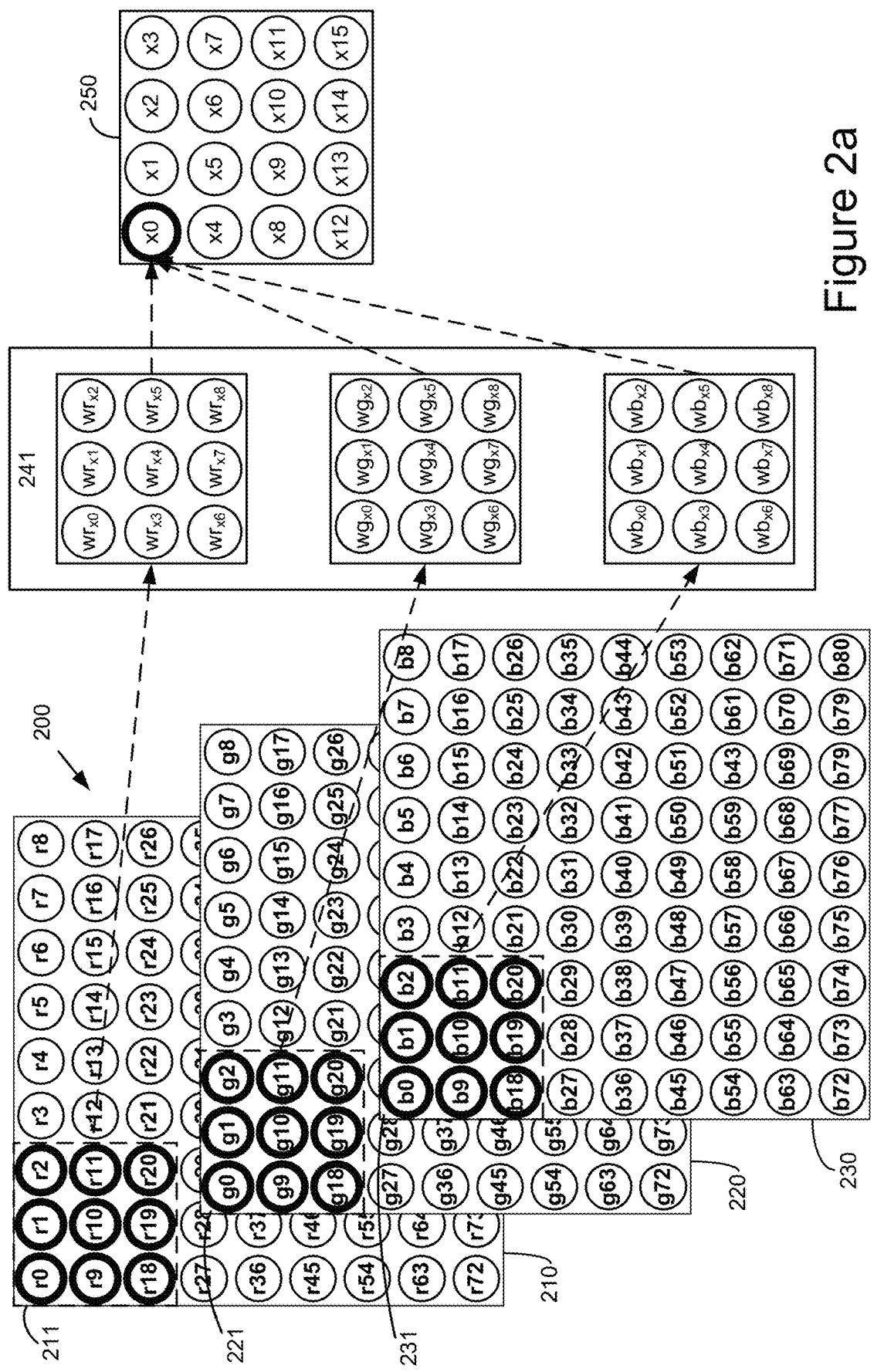
FIGS. 2a-2d are block diagrams of portions of an exemplary convolution performed by a neural network.
Figure 2B:
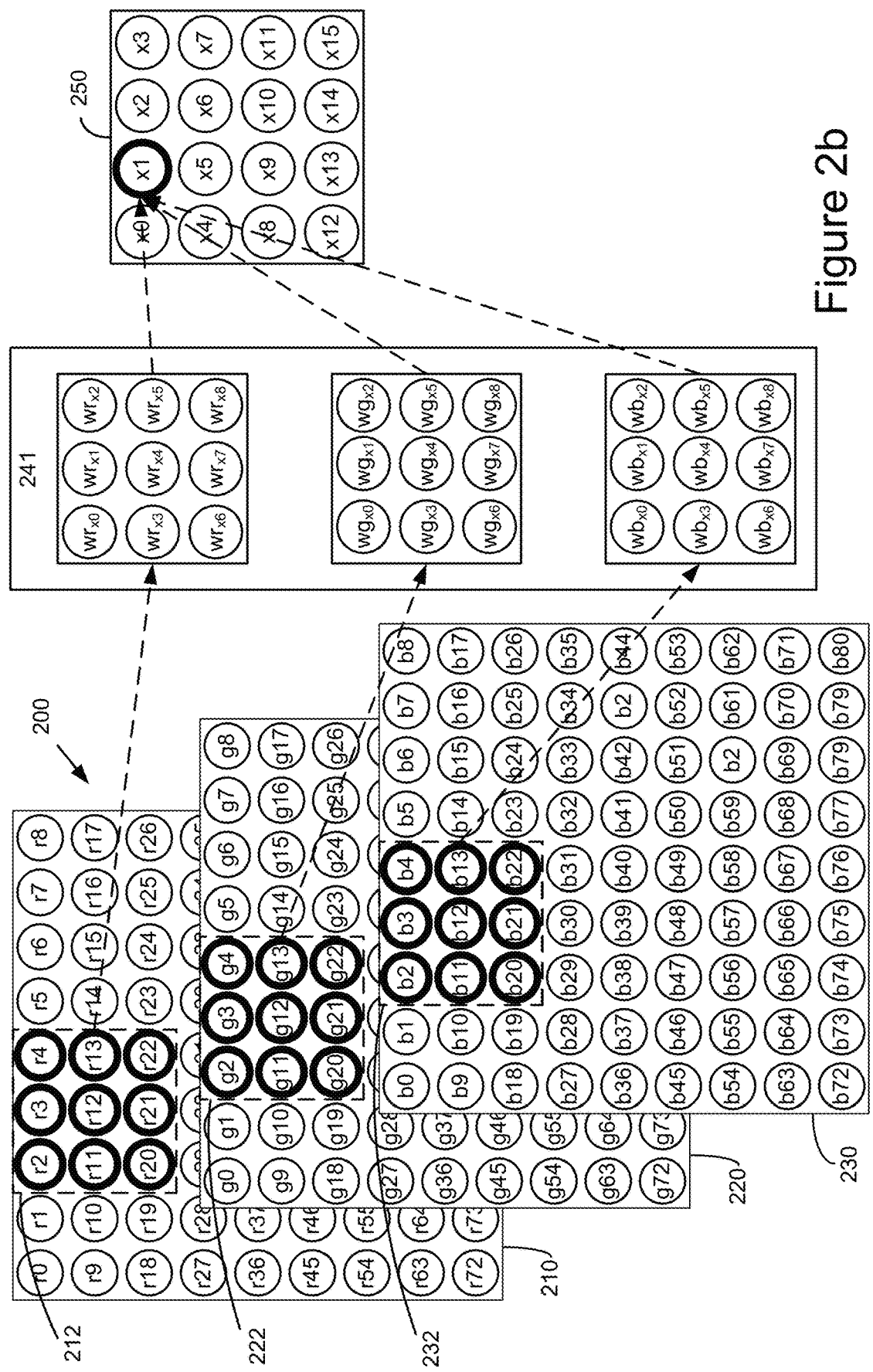
Figure 2C:
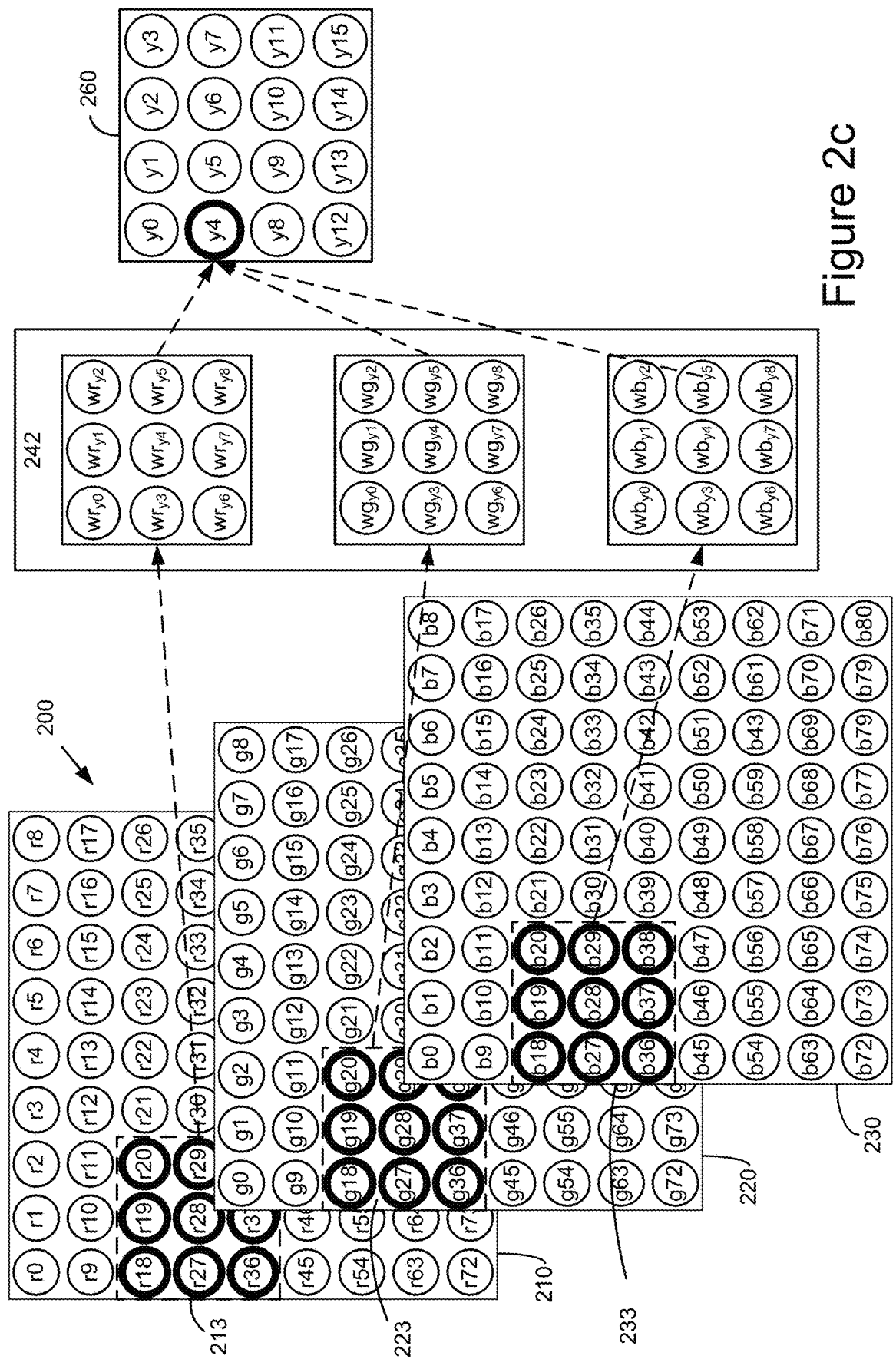
Figure 2D:
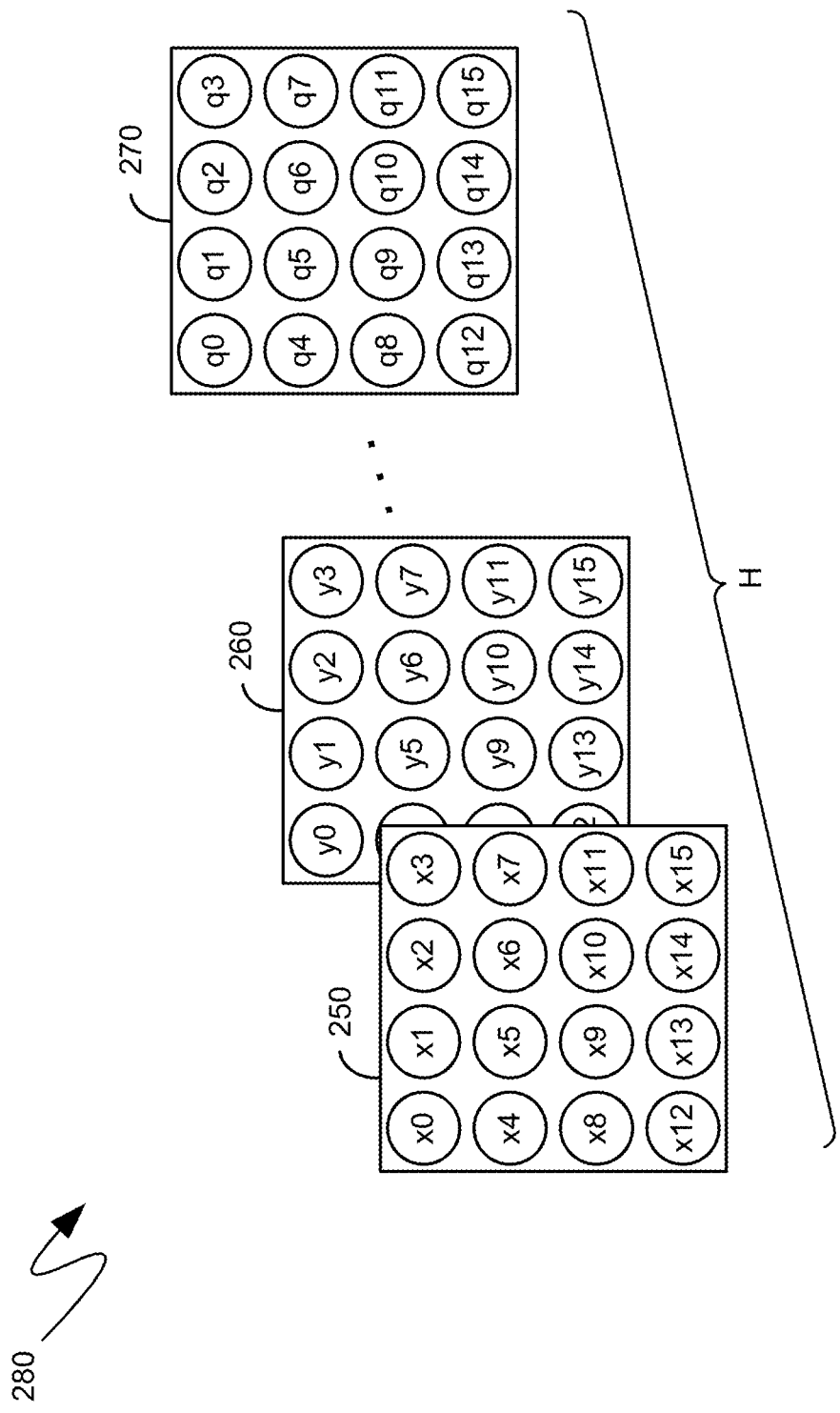

Such a process is illustrated in greater detail in FIGS. 2a-2d. More specifically, FIG. 2a shows an exemplary convolution of a volume, namely the exemplary volume 200, with a set of kernel weights, namely the exemplary kernel weights 241, to generate a first plane 250 of a second volume 280, that is shown in FIG. 2d. The exemplary first volume 200 can comprise three planes, namely the three exemplary planes 210, 220 and 230, with a nine-by-nine array of image data, for example. As indicated above, in the context of image data, the three exemplary planes can comprise a single plane of each of the colors red, green and blue. Each of a first set of kernel weights 241 can have an exemplary dimensionality of three-by-three-by-three.

As illustrated in FIG. 2a, data value x0 of an exemplary first plane 250 of the exemplary second volume 280 can be determined by multiplying every weight in the first set of kernel weights 241 with every pair-wise input element from the overlapping region of a first input volume, such as the overlapping regions 211, 221 and 231. According to one aspect, the data value x0 can be expressed as follows:

$$x0 = \begin{pmatrix} r0 & r1 & r2 \\ r9 & r10 & r11 \\ r18 & r19 & r20 \end{pmatrix} \begin{pmatrix} wr_{x0} & wr_{x3} & wr_{x6} \\ wr_{x1} & wr_{x4} & wr_{x7} \\ wr_{x2} & wr_{x5} & wr_{x8} \end{pmatrix} +$$

$$\begin{pmatrix} g0 & g1 & g2 \\ g9 & g10 & g11 \\ g18 & g19 & g20 \end{pmatrix} \begin{pmatrix} wg_{x1} & wg_{x3} & wg_{x6} \\ wg_{x1} & wg_{x4} & wg_{x7} \\ wg_{x2} & wg_{x5} & wg_{x8} \end{pmatrix} +$$

$$\begin{pmatrix} b0 & b1 & b2 \\ b9 & b10 & b11 \\ b18 & b19 & b20 \end{pmatrix} \begin{pmatrix} wb_{x1} & wb_{x3} & wb_{x6} \\ wb_{x1} & wr_{x4} & wb_{x7} \\ wb_{x2} & wb_{x5} & wb_{x8} \end{pmatrix}$$

First set of kernel weights 241 can then slide by a quantity of horizontal data values of first volume 200 determined by the stride value. FIG. 2b illustrates a stride value of two. Thus, as illustrated in FIG. 2b, data value x1 of the exemplary first plane 250 of the exemplary second volume 280 can determined by multiplying every weight in the first set of kernel weights 241 with every pair-wise input element from a slid overlapping region of a second input volume, such as the exemplary slid overlapping region 212, 222 and 232. According to one aspect, the data value x1 can be expressed as follows:

$$x1 = \begin{pmatrix} r2 & r3 & r4 \\ r11 & r12 & r13 \\ r20 & r21 & r22 \end{pmatrix} \begin{pmatrix} wr_{x0} & wr_{x3} & wr_{x6} \\ wr_{x1} & wr_{x4} & wr_{x7} \\ wr_{x2} & wr_{x5} & wr_{x8} \end{pmatrix} +$$

$$\begin{pmatrix} g2 & g3 & g4 \\ g11 & g12 & g13 \\ g20 & g21 & g22 \end{pmatrix} \begin{pmatrix} wg_{x1} & wg_{x3} & wg_{x6} \\ wg_{x1} & wg_{x4} & wg_{x7} \\ wg_{x2} & wg_{x5} & wg_{x8} \end{pmatrix} +$$

$$\begin{pmatrix} b0 & b1 & b2 \\ b11 & b12 & b13 \\ b20 & b21 & b22 \end{pmatrix} \begin{pmatrix} wb_{x1} & wb_{x3} & wb_{x6} \\ wb_{x1} & wr_{x4} & wb_{x7} \\ wb_{x2} & wb_{x5} & wb_{x8} \end{pmatrix}$$

Such a process can continue, with the first set of kernel weights 241 sliding two horizontal values, in the illustrated example, of the exemplary first volume 200, with each iteration, until the first row of data values (x0, x1, x3, x3) of first plane 250 is complete. The first set of kernel weights 241 can then slide down, for example, two rows and back to the leftmost column of first volume 200 to calculate the second row of data values (x4, x5, x6, x7) of first plane 250. This process can continue until all four rows of data values of the first plane 250 are complete.

As illustrated in FIG. 2c, the exemplary data value y4 of the exemplary second plane 260 of second volume 208 can be determined by multiplying every weight in the second set of kernel weights 242 with every pair-wise input element from the down-slid overlapping region 213, 223 and 233. According to one aspect, the data value y4 can be expressed as follows:

$$y4 = \begin{pmatrix} r18 & r19 & r20 \\ r27 & r28 & r29 \\ r36 & r37 & r38 \end{pmatrix} \begin{pmatrix} wr_{y0} & wr_{y3} & wr_{y6} \\ wr_{y1} & wr_{y4} & wr_{y7} \\ wr_{y2} & wr_{y5} & wr_{y8} \end{pmatrix} +$$

$$\begin{pmatrix} g18 & g19 & g20 \\ g27 & g28 & g29 \\ g36 & g37 & g38 \end{pmatrix} \begin{pmatrix} wg_{y1} & wg_{y3} & wg_{y6} \\ wg_{y1} & wg_{y4} & wg_{y7} \\ wg_{y2} & wg_{y5} & wg_{y8} \end{pmatrix} +$$

$$\begin{pmatrix} b18 & b19 & b20 \\ b27 & b28 & b29 \\ b36 & b37 & b38 \end{pmatrix} \begin{pmatrix} wb_{y1} & wb_{y3} & wb_{y6} \\ wb_{y1} & wr_{y4} & wb_{y7} \\ wb_{y2} & wb_{y5} & wb_{y8} \end{pmatrix}$$

Such a process can continue until all data values of second plane 260 of second volume 280 are complete, and also continues for each of the H weight volumes to generate the H planes in of second volume 280. Referring again to FIG. 1, volume 106, determined such as in the manner illustrated by FIGS. 2a-2d, and detailed above, then becomes an input layer to convolutional layer 112, which can include K weight volumes to generate the K planes of volume 108.

According to one aspect, the values of the weights utilized in the convolutions detailed above can be derived as part of the "training" of a neural network. Typically, such training starts with initial weight values proceeds iteratively, where, for each iteration, the weight values are modified in accordance with information, such as gradient information, obtained during the processing of a prior iteration. As such, the training typically entails the performance of so-called "forward" processing, or forward propagation, and "backwards" processing, or backpropagation. More specifically, forward propagation of one or more input activations through the neural network can be utilized to generate output activations, which can be prediction. Then, gradients can be determined for each of the neurons in the neural network via back-propagation of "errors" from the output layer back to the input layer. Such gradients can then be utilized to update the weights at each neuron. Repetition of such processes can continue until the weights converge.

In gradient descent, several choices can be available for selecting a number of inputs to use per iteration. A first method, batch gradient descent, can utilize all available training data, such as, for example, pre-labeled images, in each iteration between weight updates. This method can be very expensive. A second method, stochastic gradient descent, can represent another extreme by selecting one random example from the corpus between weight updates. A third method, mini-batch gradient descent, can use a random subset of the corpus to perform gradient computation, followed by a single weight update.

In practice, mini-batch gradient descent can often be a good balance between training accuracy and training time. Furthermore, mini-batching can facilitate implementation of available parallelism in hardware, by allowing gradients for different inputs to be computed in parallel (without a serial dependence on weight updates). The remainder of this description will assume mini-batch gradient descent for training.

Figure 3A:
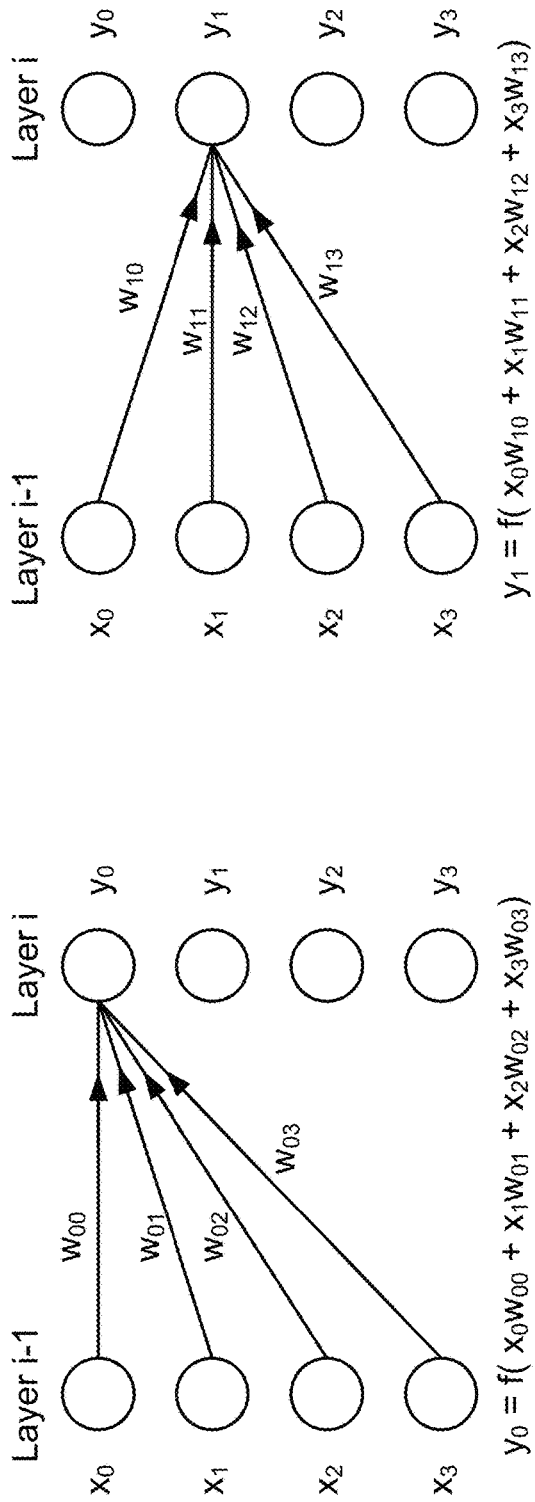
FIGS. 3a-3b are block diagrams of an exemplary neural network training.
Figure 3A:
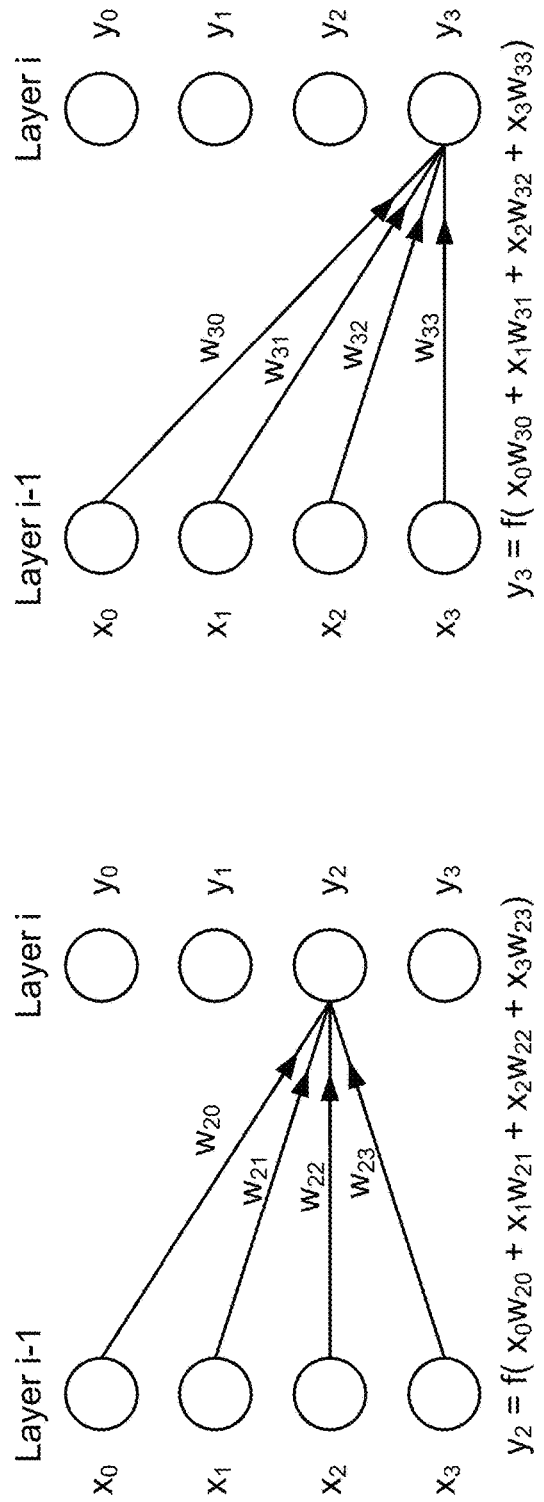

FIG. 3a illustrates an implementation of forward propagation of a single training input through a single layer. In this example, the input activations are represented by a 4-tuple vector $[x_0, x_1, x_2, x_3]^T$ in Layer i−1. Every neuron in Layer i processes the input vector of Layer i−1 using an activation function and generates output activations of Layer i. Typically, the activation function can be a weighted sum of products, taking the input activation of each neuron and scaling it by a tunable weight parameter. The dot product is further transformed by a non-linear differentiable function such as hyperbolic tangent, sigmoid or other non-linear differentiable function.

In the implementation depicted in FIG. 3a, the output activations $y_0$, $y_1$, $y_2$, $y_3$ of Layer i are expressed as:

$$y_0 = f(x_0 w_{00} + x_1 w_{01} + x_2 w_{02} + x_3 w_{03})$$

$$y_1 = f(x_0 w_{10} + x_1 w_{11} + x_2 w_{12} + x_3 w_{13})$$

$$y_2 = f(x_0 w_{20} + x_1 w_{21} + x_2 w_{22} + x_3 w_{23})$$

$$y_3 = f(x_0 w_{30} + x_1 w_{31} + x_2 w_{32} + x_3 w_{33})$$

Forward propagation can be expressed mathematically as follows: the output activations of Layer i (before non-linearization) can equal a matrix of weights for Layer i multiplied by a vector of input activations from Layer i−1:

$$\begin{pmatrix} w_{00} & \cdots & w_{03} \\ \vdots & \ddots & \vdots \\ w_{30} & \cdots & w_{33} \end{pmatrix} \begin{pmatrix} x_0 \\ \vdots \\ x_3 \end{pmatrix} = \begin{pmatrix} y_0 \\ \vdots \\ y_3 \end{pmatrix}$$

Thus, the bulk of computation is in computing the dot products. In mini-batch gradient descent, multiple input activation vectors can be processed per iteration of forward propagation. In this case, the mathematical expression shown above generalizes to matrix-matrix multiplication followed by the non-linear transformation.

After forward propagation, the result can be a set of output activations in the final output layer. In backpropagation, these output activations can then be utilized to compute output "errors" that can be propagated backwards through the network, to compute the gradients at each neuron. An example implementation of backpropagation is depicted in FIG. 3b.

Figure 3B:
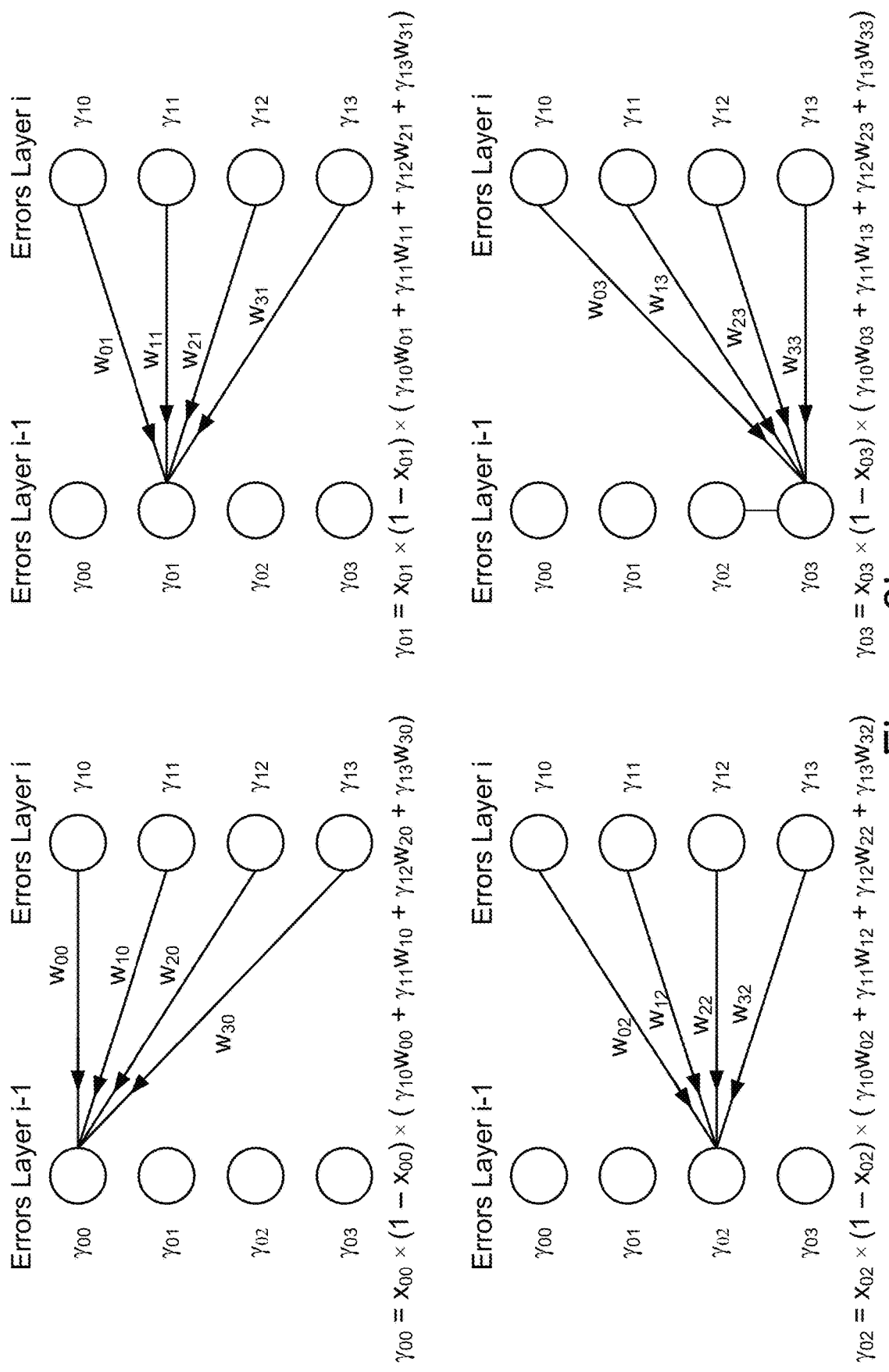

As illustrated in FIG. 3b, errors can propagate backwards in a similar fashion to forward propagation. One difference is that the error function can take, as input, the weighted sum of products and the original input activation used in a derivative term, as follows:

$$\gamma_{00} = h'(x_{00}) \times \text{WeightedSum of Errors(Layer } i)$$

$$\gamma_{01} = h'(x_{01}) \times \text{WeightedSum of Errors(Layer } i)$$

$$\gamma_{02} h'(x_{02}) \times \text{WeightedSum of Errors(Layer } i)$$

$$\gamma_{03} = h'(x_{03}) \times \text{WeightedSum of Errors(Layer } i)$$

where h'( ) is a derivative function.

For example, if the non-linear differentiable function in the forward propagation is the sigmoid function, the errors at Layer i−1 may be expressed as:

$$\gamma_{00} = x_{00} \times (1 - x_{00}) \times (\gamma_{10} w_{00} + \gamma_{11} w_{10} + \gamma_{12} w_{20} + \gamma_{13} w_{30})$$

$$\gamma_{01} = x_{01} \times (1 - x_{01}) \times (\gamma_{10} w_{01} + \gamma_{11} w_{11} + \gamma_{12} w_{21} + \gamma_{13} w_{31})$$

$$\gamma_{02} = x_{02} \times (1 - x_{02}) \times (\gamma_{10} w_{02} + \gamma_{11} w_{12} + \gamma_{12} w_{22} + \gamma_{13} w_{32})$$

$$\gamma_{03} = x_{03} \times (1 - x_{03}) \times (\gamma_{10} w_{03} + \gamma_{11} w_{13} + \gamma_{12} w_{23} + \gamma_{13} w_{33})$$

Backpropagation can be expressed mathematically as follows:

$$\begin{pmatrix} w_{00} & \cdots & w_{30} \\ \vdots & \ddots & \vdots \\ w_{03} & \cdots & w_{33} \end{pmatrix} \begin{pmatrix} \gamma_{10} \\ \vdots \\ \gamma_{13} \end{pmatrix} = \begin{pmatrix} e_{00} \\ \vdots \\ e_{03} \end{pmatrix}$$

That is, a transposed weight matrix (Layer i) multiplied by an input error vector (Layer i) equals an output error vector (Layer i−1) (before multiplying by the derivative).

Backpropagation can thus be similarly expressed as a matrix-vector multiplication that takes in a transposed weight matrix multiplied against a vector of errors, and scaled by the original activations computed during forward propagation. As indicated previously, the use of mini-batching generalizes this operation to matrix-matrix multiplication.

Once the errors are computed for each neuron, each neuron's weights are updated. In gradient descent, the weight update is given by:

$$w_{ij}' = w_{ij} - \mu \gamma_{ij} x_{ij}$$

where μ is a parameter that represents the learning rate of the neural network.

Figure 4:
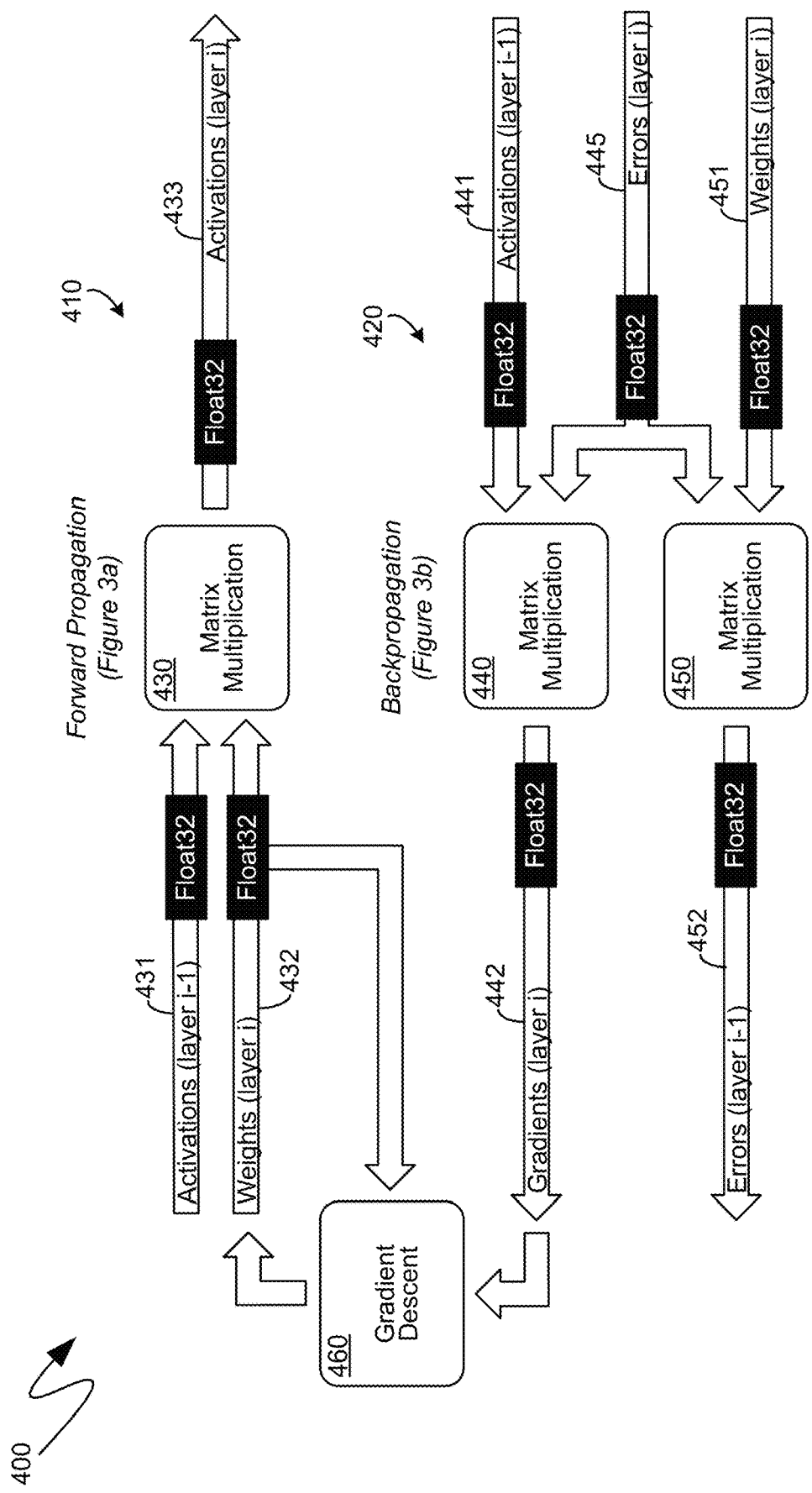
FIG. 4 is a system diagram of an exemplary neural network training utilizing values expressed in full-precision format.

As detailed above, forward propagation and backpropagation can require substantial use of matrix-matrix and matrix-vector multiplication operators. Additionally, a substantial quantity of values can need to be exchanged among multiple different computing devices during the forward propagation and backpropagation stages. Traditionally, neural network training, such as that detailed above, is performed utilizing values expressed in full-precision formats, such as the ubiquitous 32-bit single precision floating-point format. For example, the exemplary system 400, illustrated in FIG. 4, illustrates the utilization of full-precision formats to express the values utilized by the neural network training process. In particular, activations from a prior layer, represented as the exemplary activations 431 in FIG. 4, can be expressed in a full-precision format and can be utilized as input into one or more matrix multiplications, such as the exemplary matrix multiplication 430. Similarly, weights from a current layer, represented as the exemplary weights 432, can also be expressed in the full-precision format and can be provided as the other input into one or more matrix multiplications, such as the exemplary matrix multiplication 430. Output from such matrix multiplications can be activations of a current layer, represented as the exemplary activations 433, which can also be expressed in the full-precision format. The forward propagation 410, comprising the provision of the activations 431 and the weights 432 to the matrix multiplication 430 to generate the activations 433, is meant as a more general illustration of the forward propagation detailed above, such as with reference to FIG. 3a.

Similarly, activations from the prior layer, represented as the exemplary activations 441, and errors from a current layer, represented as the exemplary errors 445, can be provided as input to one or more matrix multiplications, such as the exemplary matrix multiplication 440. Again, the exemplary activations 441 and exemplary errors 445 can have their values expressed in the full-precision format, as illustrated in FIG. 4. Likewise, the exemplary errors 445 can be provided, as input, together with weights from a current layer, such as the exemplary weights 451, to one or more matrix multiplications, such as the exemplary matrix multiplication 450. The exemplary errors 445 and the exemplary weights 451 can have their values expressed in the full-precision format. Output of the exemplary matrix multiplication 440 and 450 can also be expressed in the full-precision format. Thus, as illustrated in FIG. 4, the output of the exemplary matrix multiplication 450 can be errors of a prior layer, such as the exemplary errors 452, and output of the exemplary matrix multiplication 440 can be the gradients of a current layer, such as the exemplary gradients 442, both of which can be expressed in the full-precision format. The backpropagation, comprising the provision of the activations 441 and the errors 445 to the matrix multiplication 440 to generate the gradients 442, and the provision of the errors 445 and the weights 451 to the matrix multiplication 450 to generate the errors 452, is meant as a more general illustration of the backpropagation detailed above, such as with reference to FIG. 3b.

As part of the neural network training, the weights can be updated utilizing the gradients derived by the backpropagation, such as the exemplary backpropagation 420. According to one aspect, such a weight update can include gradient descent operations, such as the exemplary gradient descent 460, as well as other relevant mathematical operations. As illustrated in FIG. 2, the exemplary gradient descent 460 can receive, as input, the exemplary weights 432, and the exemplary gradients 442, in order to generate a new iteration of the weights. Both the exemplary weights 432 and the exemplary gradients 442 can be provided to the exemplary gradient descent 460 in the full-precision format, as illustrated, and the output of the exemplary gradient descent 460 can also be in the full-precision format.

However, as detailed above, neural network training can utilize large quantities of numerical values, which, when expressed in the full-precision format, can consume large quantities of memory and processing capabilities. For example, the exemplary gradient descent 460, illustrated in FIG. 4, may not be performed with the same computing devices that perform the exemplary matrix multiplication 430, or the exemplary matrix multiplication 440 or 450. Consequently, the values representing the exemplary weights 432 or 451, for example, or the exemplary activations 431 or 441, or the exemplary errors 445, can need to be transmitted among computing devices. When expressed utilizing full-precision format, the exchange of such values can comprise the exchange of hundreds of megabytes, or even gigabytes of data. Reducing the quantity of bits utilized to represent the values, such as gradient values, activation values, weight values or error values, can reduce the quantity of data exchanged among computing devices by 50% or more, thereby enabling such data exchanges to be performed twice as quickly. Similarly, the storage of such values on computer readable storage media, from which they can be read to be provided as input to the various processes illustrated, can consume large quantities of storage, such as hundreds of megabytes or even gigabytes of storage capacity. Reducing the quantity of bits utilized to represent the values can also reduce the quantity of storage capacity consumed, including reducing such consumption by 50% or more.

In addition, matrix multiplication can consume substantial processing resources. Performing such matrix multiplication utilizing values expressed in full-precision form can require the processing of large quantities of data, which can take a long time, generate large quantities of waste heat, and prevent, or delay, the processing of other functions or instructions. Reducing the quantity of bits utilized to represent values can reduce the time taken to perform the matrix multiplication by 50% or more, enable the performance of more multiplications in parallel utilizing the same processing hardware, which can result in the multiplication being performed in less than half the time, or otherwise reduce the consumption of processing resources and increase the speed and efficiency with which matrix multiplication is performed.

Figure 5:
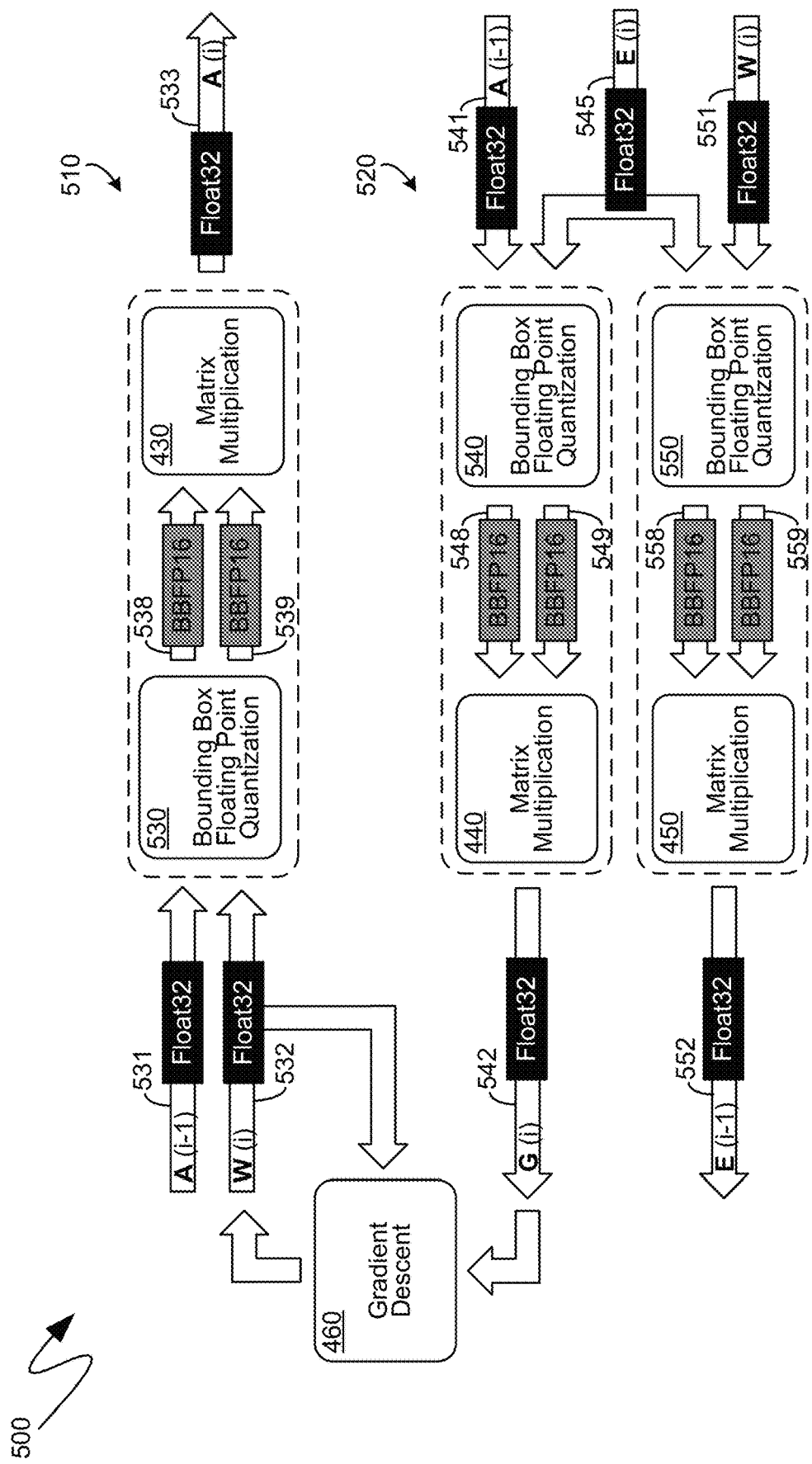
FIG. 5 is a system diagram of an exemplary neural network training comprising matrix multiplication performed utilizing values expressed in reduced-precision format.

According to one aspect, therefore, the matrix multiplication performed by the forward propagation and back-propagation can be performed utilizing numerical values expressed in reduced-precision formats. Turning to FIG. 5, the exemplary system 500 shown therein illustrates an exemplary performance of forward propagation and back-propagation utilizing numerical values expressed in reduced-precision formats. More specifically, the exemplary forward propagation 510 illustrates the exemplary matrix multiplication 430 of the exemplary forward propagation 410 shown in FIG. 4, except with such matrix multiplication 430 now being performed utilizing values expressed in bounding box floating-point format, and expressed utilizing a fewer quantity of bits, than the full-precision format utilized in the exemplary forward propagation 410 shown in FIG. 4. In particular, activations from a prior layer, represented as the exemplary activations 531, can still be expressed in a full-precision format and can still be provided as input into the exemplary matrix multiplication 430. Similarly, weights from a current layer, represented as the exemplary weights 532, can also still be expressed in the full-precision format and can still be provided as the other input into the exemplary matrix multiplication 430. However, prior to performing the exemplary matrix multiplication 430, a bounding box floating-point quantization, such as the exemplary bounding box floating-point quantization 530 can quantize, into a bounding box floating-point reduced-precision format, the values of the exemplary activations 531, and the exemplary weights 532, previously expressed in the full-precision format. The exemplary matrix multiplication 430 can then be performed on the values of the exemplary activations and the exemplary weights as expressed utilizing the bounding box reduced-precision format.

Figure 6:
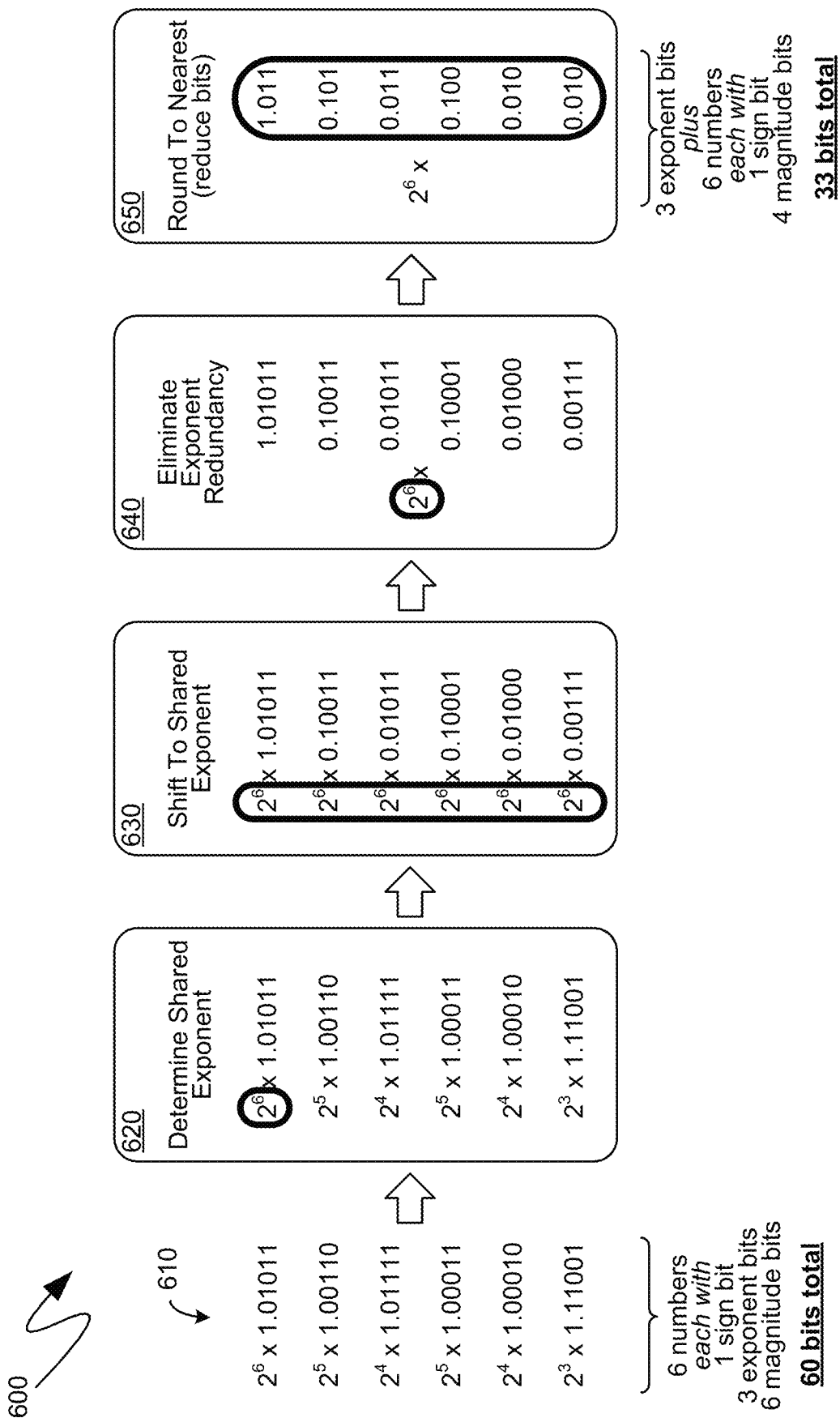
FIG. 6 is a block diagram of an exemplary bounding box format for representing numerical values.

Turning to FIG. 6, the exemplary system 600 shown therein illustrates an exemplary conversion from a higher-precision numerical format to a lower-precision numerical format in accordance with bounding box techniques. For example, an exemplary set of six numerical values 610 is illustrated in FIG. 6. As illustrated, each of the numerical values of the set 610 can be expressed utilizing one bit representing whether the value is positive or negative, three bits representing, in binary, the value of the exponent, and six bits representing, in binary, the magnitude of the value, which is sometimes referred to as the "fraction", the "significand" and/or the "mantissa". An initial step 620, in converting the higher-precision format, in which the values of the set 610 are represented, into a lower-precision format in accordance with bounding box techniques, can comprise determining a shared exponent. For example, a shared exponent can be the largest exponent value in the set of values. Thus, in the exemplary set of values 610, a shared exponent can be the exponent $2^6$, as illustrated in FIG. 6. Subsequently, at step 630, the values in the exemplary set of values 610 can all be shifted to be represented in the shared exponent. As can be seen, the values of the significand can decrease as the corresponding exponent is increased to be the same as the shared exponent. At step 640, because all of the values now share the same exponent, only a single instance of the exponent can be represented, thereby eliminating redundancy in having each value consume a certain quantity of bits to represent the same, shared exponent. A further reduction can then reduce the quantity of bits utilized to express the significand. Thus, for example, at step 650, a quantity of bits utilized to represent the significand can be reduced from six bits in the set 610 to four bits in the set being generated by step 650. Such a reduction can be performed by rounding to the nearest value directly representable by four bits, such as in the manner shown. Other rounding mechanisms can likewise be utilized, such as simply discarding the least significant bits, stochastic rounding, which will be described in further detail below, or other rounding mechanisms.

As can be seen, fewer quantities of bits can be utilized to represent values, at least in part because all of the values in a set of values share a common exponent. Such a common exponent can reduce the quantity of bits utilized to represent the value, and can also decrease the quantity of bits processed by the circuitry of a processing unit in performing mathematical operations on such values. According to one aspect, a common exponent can be inferred, such that each representation of a value utilizes zero bits as part of an explicit reference to the common exponent. According to other aspects, one or more bits, within the representation of the value, can be utilized to reference a common exponent, with savings still being realized to the extent that the quantity of bits utilized to reference the common exponent is less than the quantity of bits that would have been utilized to represent the common exponent itself.

Turning back to FIG. 5, as detailed above, the bounding box floating-point quantization 530 can convert the activation values 531, in the full-precision format, to activation values 538 in a reduced-precision format, such as the bounding box format detailed above, which can utilize fewer quantities of bits to express the activation values. In a similar manner, the bounding box floating-point quantization 530 can convert the weight values 532, in the full-precision format, to weight values 539 in a reduced-precision format. The matrix multiplication 430 can then be performed utilizing the activation values 538 and the weight values 539, both in the reduced-precision format. As such, the matrix multiplication 430 can process meaningfully fewer bits of data and, consequently, can be completed more quickly, and with less processor utilization.

Output from such matrix multiplications can be activations of a current layer, represented as the exemplary activations 533, which can be expressed in the full-precision format. More specifically, the multiplication of two values, represented with a given quantity of bits, can result in a third value that can have a greater quantity of bits. In such a manner, while the matrix multiplication 430 may receive, as input, values expressed utilizing reduced-precision formats, the resulting output of the matrix multiplication 430 can be values expressed in utilizing higher-precision formats. Such a higher-precision format can include a standard format, such as the exemplary full-precision format detailed above. In instances where output of the matrix multiplication 430 can comprise fewer bits then that called for by the full-precision format, bit padding or other like mechanisms can be utilized to increase a quantity of bits utilized to represent the values being output by the matrix multiplication 430.

Bounding box floating-point quantization can also be utilized, in an equivalent manner to that detailed above, to increase a speed and efficiency with which the matrix multiplications 440 and 450, which can be part of the exemplary backpropagation 520, can be performed. More specifically, the exemplary activations 441, and the exemplary errors 445, can be provided as input to the exemplary matrix multiplication 440, with their values expressed in the full-precision format. And the exemplary errors 445 can be provided, with the exemplary weights 451, to the exemplary matrix multiplication 450 with their values expressed in the full-precision format. As above, the bounding box floating-point quantization 540 can convert the activation values 541 and the errors 545, in the full-precision format, to activation values 548 and errors 548 in a reduced-precision format, such as the bounding box format detailed above. Similarly, the bounding box floating-point quantization 550 can convert the weight values 551 and errors 545, in the full-precision format, to weight values 559 and errors 558 in a reduced-precision format. The matrix multiplication 440 can then be performed utilizing the activation values 548 and the error values 549, both in the reduced-precision format and, analogously, the matrix multiplication 450 can then be performed utilizing the error values 558 and the weight values 559, again, both in the reduced-precision format. As before, such a change can result in the matrix multiplications 440 and 450 processing meaningfully fewer bits of data and, consequently, enabling such matrix multiplications to be completed more quickly, and with less processor utilization. The output of the matrix multiplications 440 and 450, namely the gradients 542 and the errors 552 can be expressed in a higher-precision format, such as the full-precision format, in accordance with the mechanisms and reasons detailed above.

The exemplary system 500, shown in FIG. 5, still entails the exchange of values expressed utilizing high-precision formats among computing devices as the inputs and outputs of the forward propagation, backpropagation and weight update portions of the neural network training process. As detailed above, such can require the transmission of hundreds of megabytes, or even gigabytes, of data, and, likewise, the storage of hundreds of megabytes, or even gigabytes, of data locally on computing devices performing the above detailed processing. According to one aspect, to reduce the transmission time, and memory utilization and storage requirements, while still providing sufficient precision for the training process to complete properly, reduced-precision formats can be utilized for the inputs and outputs of the forward propagation, backpropagation and weight update portions of the neural network training process.

Figure 7:
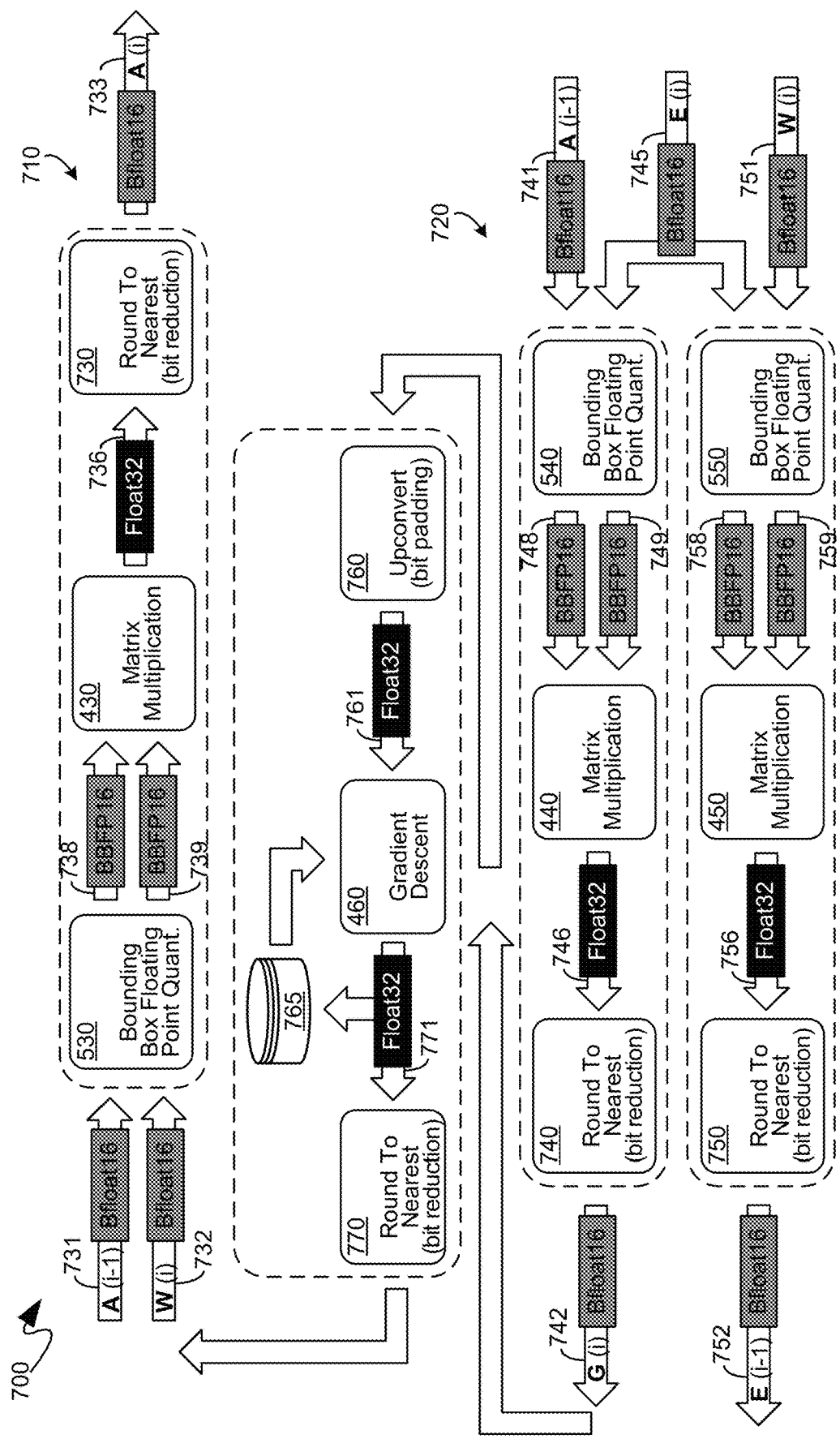
FIG. 7 is a system diagram of an exemplary neural network training utilizing values expressed in reduced-precision format.

Turning to FIG. 7, the exemplary system 700 shown therein illustrates an exemplary forward propagation 710, with the exemplary matrix multiplication 430 being performed utilizing values expressed in a reduced-precision format, such as the bounding box floating-point format detailed above. In particular, activations from a prior layer, represented as the exemplary activations 731 and weights from a current layer, represented as the exemplary weights 732, can be provided as input into the bounding box floating-point quantization 530 which can convert such values into the activations 738, in a reduced-precision format, and the weights 739, in the reduced-precision format, which are then utilized by the exemplary matrix multiplication 430 to generate the exemplary activations 736 in a higher-precision format.

Within the exemplary system 700 shown in FIG. 7, however, input and output values can be exchanged utilizing reduced-precision formats. Thus, for example, the exemplary activations 731 and the exemplary weights 732 can be received in a reduced-precision format. Similarly, the exemplary activations 736, generated by the matrix multiplication 430, can be converted to a lower-precision format. For example, the round to nearest process 730 can reduce the quantity of bits utilized to represent the activations 736, outputting the activations in a reduced-precision format as the exemplary activations 733. According to one aspect, the format utilized for the exemplary activations 733 can be a brain floating-point format, sometimes abbreviated as "bfloat". One advantage to utilizing a brain floating-point format can be that a quantity of bits utilized to represent the exponent value can be the same between, for example, a 16-bit brain floating-point format and the ubiquitous 32-bit single precision floating-point format. Consequently, the round to nearest 730 can focus only on the bits representing the significand, rendering such a conversion operation faster and more efficient. Other mechanisms for rounding, such as stochastic rounding, or simply discarding the least significant bits, can be used in place of the round to nearest 730. Although illustrated as converting from 32-bit single precision floating-point format to 16-bit brain floating-point format, the output of the matrix multiplication 430 may not comprise thirty-two bits of precision. To the extent that the output of the matrix multiplication 430 comprises greater precision than that of the reduced-precision format in which inputs and outputs are to be exchanged, the round to nearest 730 can still perform some form of rounding to reduce a quantity of bits and, thereby, reduce the precision of the format in which the values output by the matrix multiplication 430, namely the exemplary activations 736, are provided as output to the exemplary forward propagation 710.

In an analogous manner, the exemplary backpropagation 720 can receive values in reduced-precision formats, and, similarly, output values in reduced-precision formats. More specifically, and as illustrated in FIG. 7, the exemplary activations 741, errors 745 and weights 751 that act as input to the exemplary backpropagation 720 can be in reduced-precision formats, such as those detailed above. A bounding box floating-point quantization, such as the exemplary bounding box floating-point quantizations 540 and 550, can convert the values received in one reduced-precision format, such as the aforementioned brain floating-point format, to a different reduced-precision format, such as the aforementioned bounding box floating-point format. Thus, for example, the bounding box floating-point quantization 540 can convert the activation values 741 and the errors 745, in one reduced-precision format, such as the brain floating-point format, to activation values 748 and errors 748 in a different reduced-precision format, such as the bounding box format detailed above. Similarly, the bounding box floating-point quantization 550 can convert the weight values 751 and errors 745 to weight values 759 and errors 758. The matrix multiplication 440 can then be performed utilizing the activation values 748 and the error values 749 and the matrix multiplication 450 can then be performed utilizing the error values 758 and the weight values 759. As with the exemplary forward propagation 710, the output of the matrix multiplication 440, namely the gradients 746 and errors 756, respectively, both in a higher-precision format, can be downconverted to a reduced-precision format, such as by the round to nearest 740 and 750, respectively. The round to nearest 740 can downconvert the gradient values 746 to be represented by the same bit quantity brain floating-point format utilized for the input into the exemplary backpropagation 720, thereby outputting the exemplary gradient values 742, and the round to nearest 750 can, similarly, downconvert the error values 756 to be represented by the same bit quantity brain floating-point format, outputting the exemplary error values 752.

According to one aspect, weight updates, such as the weight updates performed by the exemplary gradient descent 460, can be performed utilizing higher-precision formats, such as the exemplary 32-bit single precision floating-point format. However, the weight update can receive, as input, gradients in a lower-precision format, such as the exemplary gradients 742. Accordingly, an upconversion, such as the exemplary upconversion 760, can increase the quantity of bits utilized to represent the gradient values received as input. Such upconverted gradient values 761 can then be input into the gradient descent 460. Similarly, the weight update can receive, as input, prior weights in a lower-precision format.

Depending on the mechanism utilized to generate the lower-precision format versions of the prior weights, the lower-precision format versions of the prior weights may not have sufficient precision to allow repeated iterations of the system 700 to converge onto a narrow range of weight values, or singular weight values, and, consequently, fail to properly train the neural network. In such an instance, prior weight values in a higher-precision format can be locally retained and utilized in a subsequent iteration. Thus, for example, the exemplary system 700 illustrates that weight values 771, generated by the gradient descent 460, in a higher-precision format, such as a full-precision format, can be stored on the storage media 765 for utilization during a subsequent iteration of the gradient descent 460. The weight values 771, in the higher-precision format, can also be converted to a reduced-precision format, such as the reduced-precision format utilized for the input and output values of the forward propagation, backpropagation and weight update in the system 700. Accordingly, the weight values 771 can be converted to such a reduced-precision format by the round to the nearest 770, or other like rounding mechanism. Such an output can then be provided as input to a subsequent iteration of the exemplary forward propagation 710.

According to another aspect, rather than retaining a copy of the weight values 771 in a higher-precision format, stochastic rounding can be utilized in place of the round to the nearest 770. In such an instance, the added precision provided by stochastic rounding can be sufficient to enable weight values to converge and the training of the neural network to be successful. More specifically, and as illustrated by the exemplary system 800 of FIG. 8, the weight values 871, generated by the gradient descent 460, in a higher-precision format, such as a full-precision format, can be stochastically rounded, such as by the exemplary stochastic rounding 870, to a reduced-precision format, such as the brain floating-point format detailed above. In such an instance, a subsequent iteration of the gradient descent 460 can utilize the previously generated weight values in the reduced-precision format, except upconverted, such as by the exemplary upconversion 860, to a higher-precision format, such as the full-precision format. In such a manner, a separate copy of the weight values in a higher-precision format need not be retained.

Figure 9:
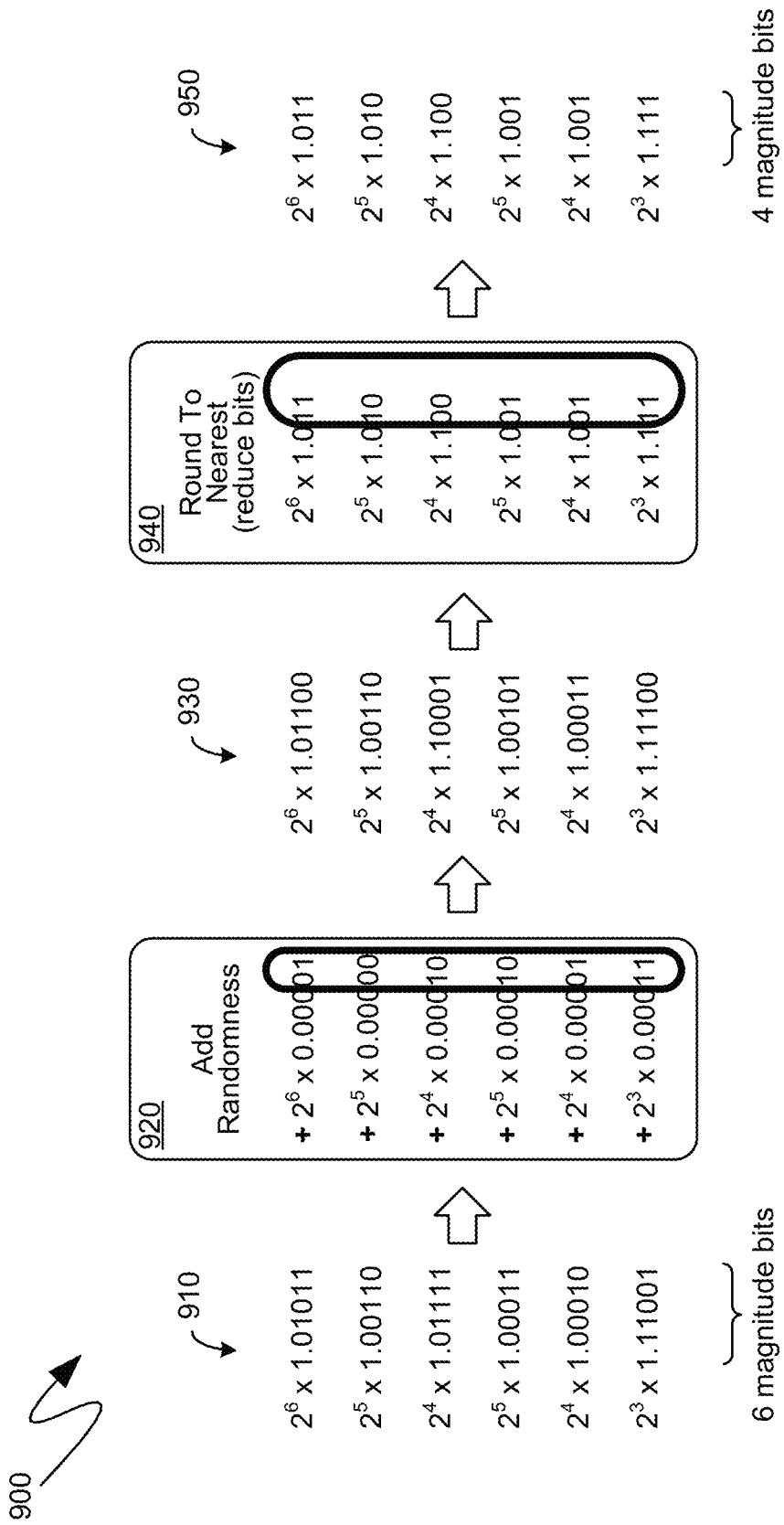
FIG. 9 is a block diagram of an exemplary stochastic rounding.

Turning to FIG. 9, an exemplary stochastic rounding mechanism is illustrated with reference to the system 900 shown therein. More specifically, a set of values 910 can, prior to a rounding operation, such as the exemplary round to nearest step 940, have a randomness added to the values, as illustrated by step 920. The resulting values 930 can then be rounded at step 940 to achieve reduced-bit and reduced-precision values 950. As a simple example, a value of ¾ would be rounded to a value of "one" utilizing a round to nearest approach. By contrast, utilizing stochastic rounding, the randomness added to the value of ¾ can include negative values such that the value of ¾ is reduced and, indeed 25% of the time, the value of ¾ would be reduced below ½ such that it would be rounded down to "zero" in those 25% of cases. When considered in aggregate, stochastic rounding can be more accurate. For example, if ten values of ¾ were added together, the total would be "seven and one-half". If the ten values of ¾ were rounded first, utilizing round to nearest, and then added, the total value would be "ten" because each of those ten values would be rounded up to "one". By contrast, utilizing stochastic rounding, the total value would be closer to "eight", since, in approximately 25% of the instances, ¾ would be reduced below ½ by the randomness that is added prior to rounding, and would, thus, be rounded to "zero". As can be seen, when considered in aggregate, stochastic rounding can be more accurate.

Accordingly, in addition to being utilized in the manner detailed above to reduce the precision of the output of the gradient descent 460, stochastic rounding, such as in the manner shown by the exemplary system 900 of FIG. 9, can be utilized in other precision-reduction operations, including, the bounding box floating point quantizations 530, 540 and 550 and the round to nearest 730, 740 and 750 and corresponding round to nearest 830, 840 and 850. Turning first to the bounding box floating point quantizations 530, 540 and 550, and with reference to the exemplary system 600 of FIG. 6, the step 650 could reduce the quantity of bits utilized to express the significand by utilizing stochastic rounding, such as in the manner illustrated by the exemplary system 900 of FIG. 9. Any one or more of the bounding box floating point quantizations 530, 540 and 550, including as part of the exemplary system 500 of FIG. 5, the exemplary system 700 of FIG. 7 and/or the exemplary system 800 of FIG. 8, can utilize stochastic rounding, such as in the manner detailed herein. Similarly, turning to the round to nearest 730, 740 and 750 and corresponding round to nearest 830, 840 and 850, any one or more of them, including as part of the exemplary system 700 of FIG. 7 and/or the exemplary system 800 of FIG. 8, can also utilize stochastic rounding, such as in the manner detailed herein.

Turning back to FIG. 8, the remainder of the processing illustrated in the exemplary system 800 can be analogous to that described in detail above with reference to exemplary system 700, with the exception of the exemplary stochastic rounding 870 and upconversion 860. Since the utilization of stochastic rounding can result in different values, different identifying numerals are utilized within the exemplary system 800 to identify the values of the weights, activations, errors and gradients. However, numbers identifying values in the exemplary system 800 having a form of 8xx correspond to the same values in the exemplary system 700 having a form 7xx, where "xx" are the same digits, the values in the exemplary system 700 having been described in detail above.

Figure 10:
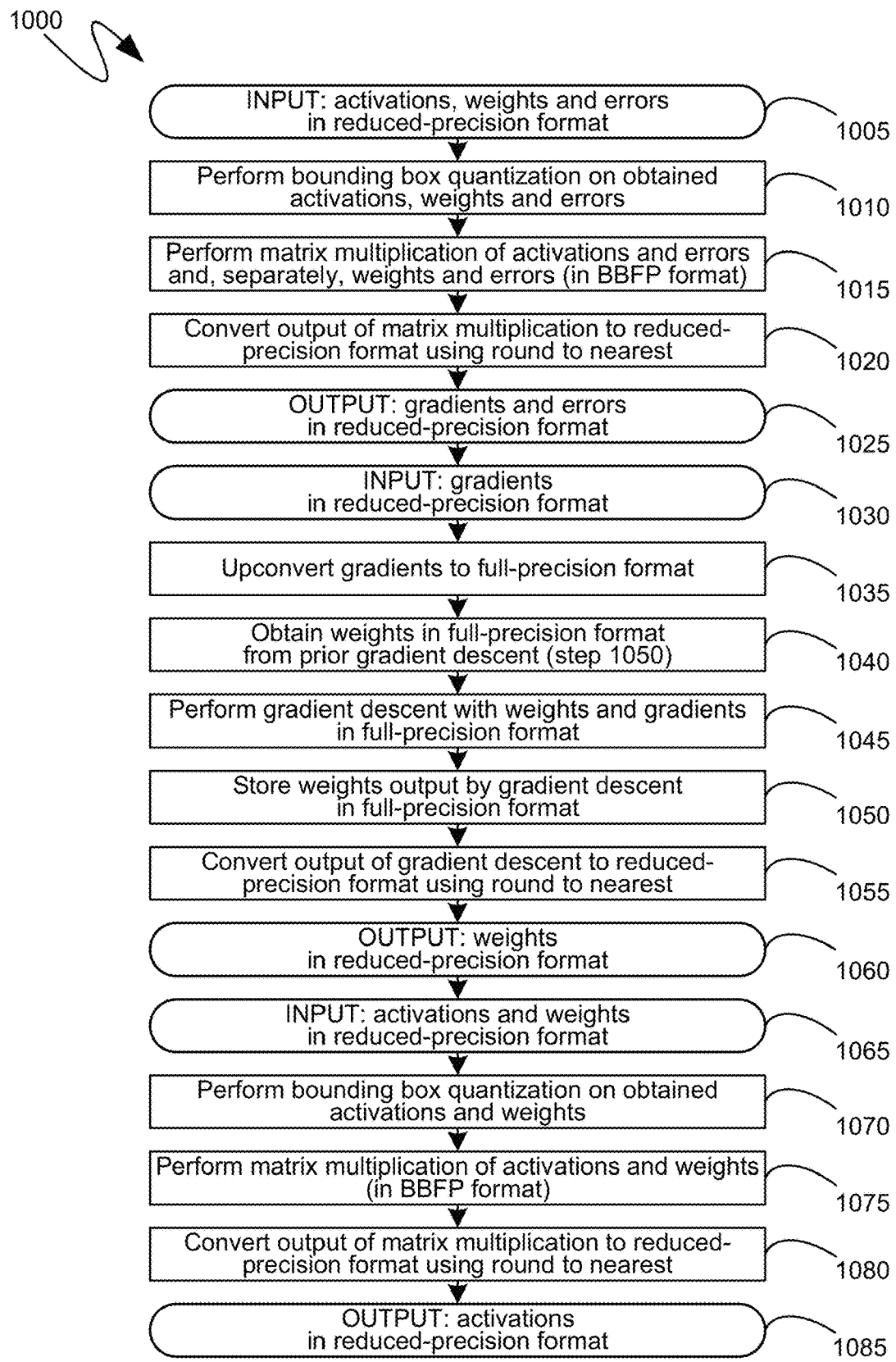
FIG. 10 is a flow diagram of an exemplary neural network training utilizing values expressed in reduced-precision format.

Turning to FIG. 10, the exemplary flow diagram 1000 shown therein illustrates an exemplary series of steps that could be performed by the exemplary system 700, shown in FIG. 7, to train a neural network. An exemplary backpropagation is represented by the steps 1005 through 1025, an exemplary weight update is represented by the steps 1030 through 1060, and an exemplary forward propagation is represented by the steps 1065 through 1085. More specifically, at step 1005, activation, weight and error values, expressed in a reduced-precision format, can be received as input. Prior to performing matrix multiplication, such as at step 1015, bounding box quantization can be performed at step 1010. The resulting values, expressed utilizing a reduced quantity of bits, can be utilized to perform the matrix multiplication of step 1015, and the resulting output can be converted to a reduced-precision format at step 1020 for purposes of being output at step 1025. The output, at step 1025, can include gradient values and error values, represented in reduced-precision format.

The gradient values in reduced-precision format can be part of the input received at step 1030, and such gradient values can be upconverted at step 1035 prior to being utilized to perform gradient descent at step 1045. At step 1040, the weight values generated by a prior iteration of step 1045, and stored by a prior iteration of step 1050, can be obtained. Those high-precision weight values can be utilized to perform the gradient descent of step 1045, and the resulting output can be stored in a high-precision format at step 1050. The output weight values can also be converted to a reduced-precision format at step 1055 and output in that format at step 1060.

The weight values in the reduced-precision format can be part of the input received at step 1065, together with activations, also in a reduced-precision format. Prior to performing matrix multiplication, such as at step 1075, a bounding box quantization can be performed at step 1070. The resulting values, expressed utilizing a reduced quantity of bits, can be utilized to perform the matrix multiplication of step 1075, and the resulting output can be converted to a reduced-precision format at step 1080 for purposes of being output at step 1085. The output, at step 1085, can include activation values represented in reduced-precision format.

Figure 8:
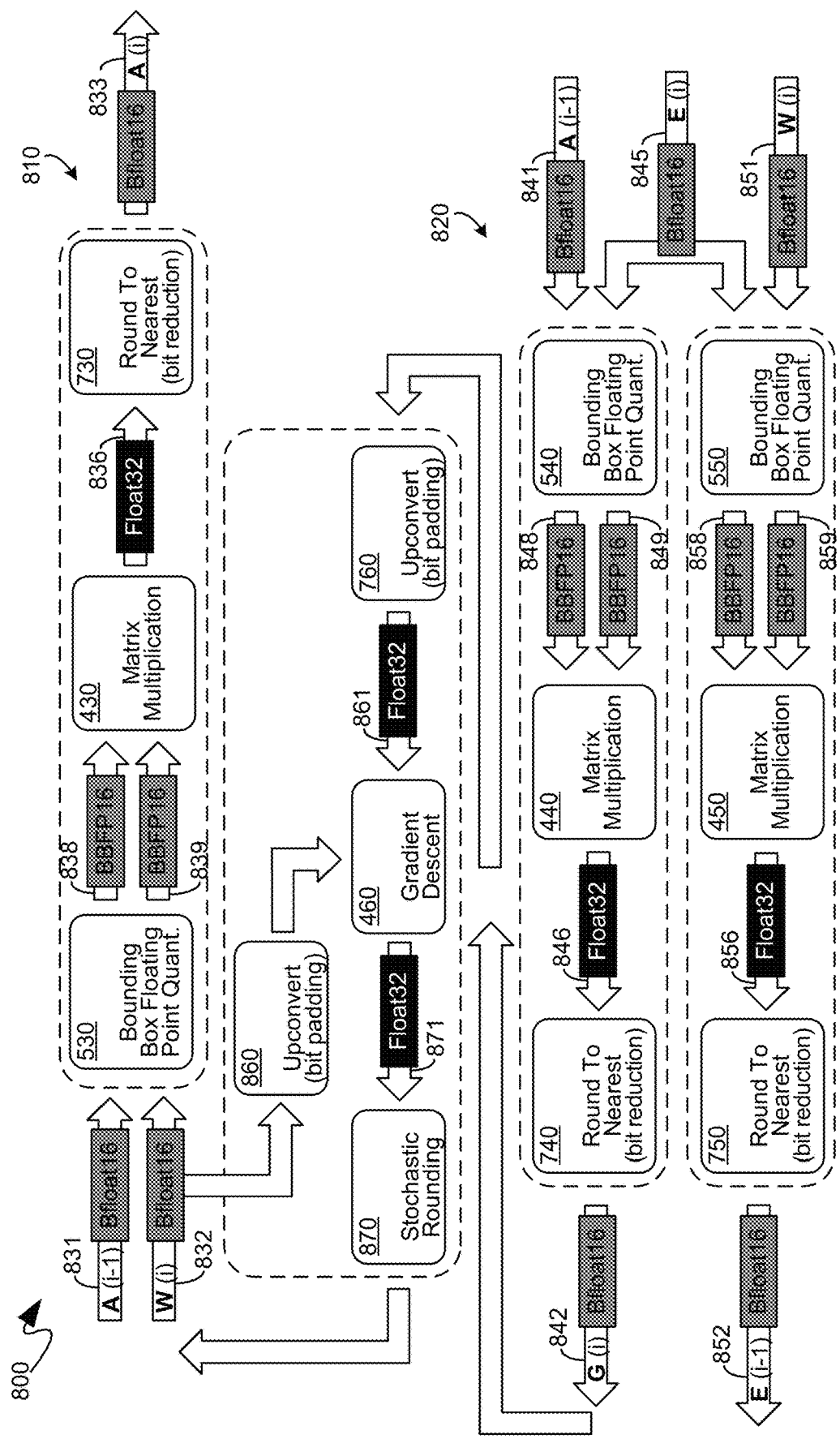
FIG. 8 is a system diagram of another exemplary neural network training utilizing values expressed in reduced-precision format.
Figure 11:
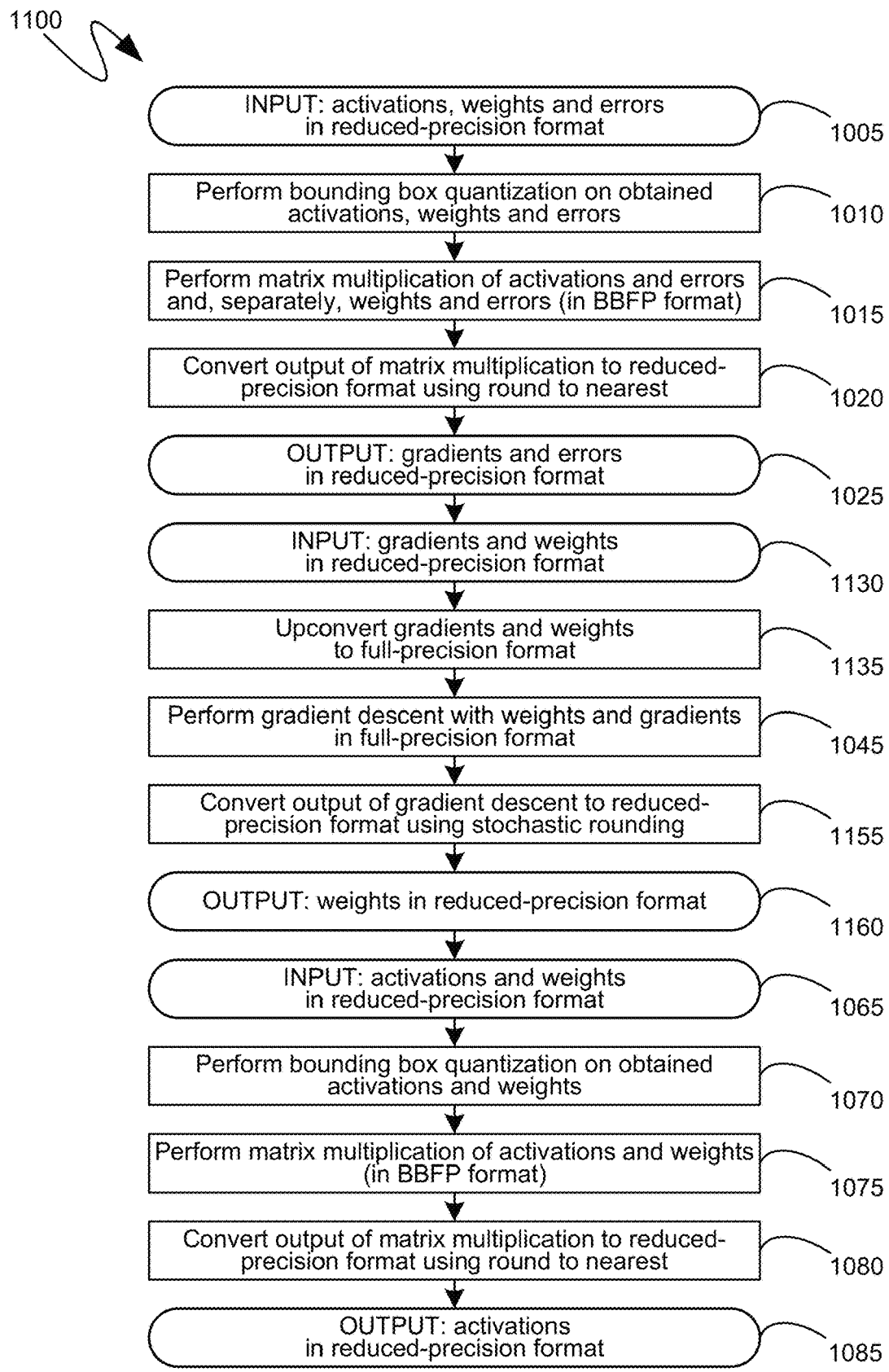
FIG. 11 is a flow diagram of another exemplary neural network training utilizing values expressed in reduced-precision format.

Turning to FIG. 11, the exemplary flow diagram 1100 shown therein illustrates an exemplary series of steps that could be performed by the exemplary system 800, shown in FIG. 8, to train a neural network. To the extent that the steps of the exemplary flow diagram 1100 are the same as those of the exemplary flow diagram 1000 shown in FIG. 10 and described in detail above, those steps are nominated with the same identifiers in FIG. 11 as they are in FIG. 10. As can be seen, FIG. 11 can differ from FIG. 10 in the weight update represented by steps 1130 through 1160. More specifically, at step 1130 the input received by the weight update can comprise both gradients and weights in a reduced-precision format, both of which can then be upconverted at step 1135 to a higher-precision format. The gradient descent performed by step 1045 can be the same as that of the exemplary flow diagram 1000 described above. Subsequently, the updated weight values generated by the performance of step 1045 can be converted to a reduced-precision format utilizing stochastic rounding at step 1155. The weight values, expressed utilizing such a reduced-precision format, can then be output at step 1160. In such a manner, the exchange of such weight values can occur more quickly than if such a weight values were expressed in higher-precision formats, and the weight values can be stored in less memory. Moreover, a separate copy of higher-precision weight values can be unnecessary, thereby preventing additional storage utilization and saving storage capacity.

Figure 12:
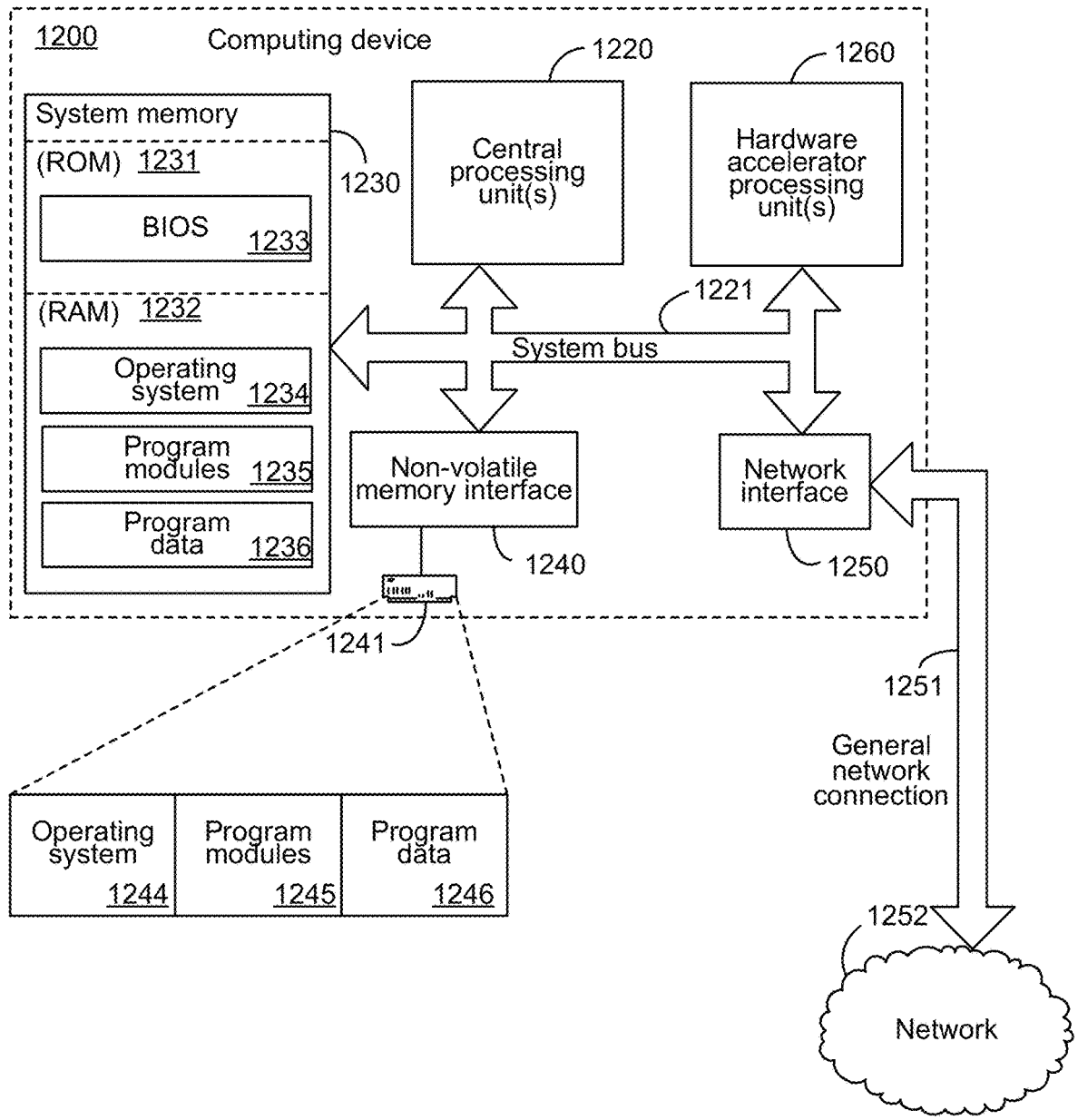
FIG. 12 is a block diagram of an exemplary computing device.

Turning to FIG. 12, an exemplary computing device 1200 is illustrated which can perform some or all of the mechanisms and actions described above. The exemplary computing device 1200 can include, but is not limited to, one or more central processing units (CPUs) 1220, one or more hardware accelerator processing units 1260, a system memory 1230, and a system bus 1221 that couples various system components including the system memory to the processing units 1220 and 1260. The central processing unit 1220 can comprise circuitry that provides for the performance of general processing operations. The hardware accelerator processing unit 1260 can comprise circuitry that provides for the performance of specific processing operations for which such circuitry is designed, and often comprises multiple such circuitry in parallel. The system bus 1221 may be any of several types of bus structures including a memory bus or memory controller, a peripheral bus, and a local bus using any of a variety of bus architectures. Depending on the specific physical implementation, one or more of the CPUs 1220, the system memory 1230, the hardware accelerator processing unit 1260 and other components of the computing device 1200 can be physically co-located, such as on a single chip. In such a case, some or all of the system bus 1221 can be nothing more than silicon pathways within a single chip structure and its illustration in FIG. 12 can be nothing more than notational convenience for the purpose of illustration.

The computing device 1200 also typically includes computer readable media, which can include any available media that can be accessed by computing device 1200 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 1200. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer content between elements within computing device 1200, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, other program modules 1235, and program data 1236.

The computing device 1200 may also include other removable/non-removable, volatile/nonvolatile computer storage media. By way of example only, FIG. 12 illustrates a hard disk drive 1241 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 1241 is typically connected to the system bus 1221 through a non-volatile memory interface such as interface 1240.

The drives and their associated computer storage media discussed above and illustrated in FIG. 12, provide storage of computer readable instructions, data structures, program modules and other data for the computing device 1200. In FIG. 12, for example, hard disk drive 1241 is illustrated as storing operating system 1244, other program modules 1245, and program data 1246. Note that these components can either be the same as or different from operating system 1234, other program modules 1235 and program data 1236. Operating system 1244, other program modules 1245 and program data 1246 are given different numbers hereto illustrate that, at a minimum, they are different copies.

The computing device 1200 may operate in a networked environment using logical connections to one or more remote computers. The computing device 1200 is illustrated as being connected to the general network connection 1251 (to the network 190) through a network interface or adapter 1250, which is, in turn, connected to the system bus 1221. In a networked environment, program modules depicted relative to the computing device 1200, or portions or peripherals thereof, may be stored in the memory of one or more other computing devices that are communicatively coupled to the computing device 1200 through the general network connection 12121. It will be appreciated that the network connections shown are exemplary and other means of establishing a communications link between computing devices may be used.

Although described as a single physical device, the exemplary computing device 1200 can be a virtual computing device, in which case the functionality of the above-described physical components, such as the CPU 1220, the system memory 1230, the network interface 1240, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 1200 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example a method of increasing processing speed and decreasing digital storage consumption in performing neural network training utilizing one or more computing devices, the method comprising: performing, with the one or more computing devices, a forward propagation of the neural network training that receives, as input, a first set of weight values in a first reduced-precision format and a first set of activation values in the first reduced-precision format, and that outputs, into storage, a second set of activation values in the first reduced-precision format; performing, with the one or more computing devices, a backpropagation of the neural network training that receives, as input, a first set of weight values in the first reduced-precision format, a first set of error values in the first reduced-precision format and the first set of activation values in the first reduced-precision format, and that outputs, into storage, a first set of gradient values in the first reduced-precision format and a second set of error values in the first reduced-precision format; and performing, with the one or more computing devices, a weight update of the neural network training utilizing a first set of weight values in a full-precision format and a first set of gradient values in the full-precision format, the performing the weight update resulting in a storage of a second set of weight values in the reduced-precision format; wherein the forward propagation and the backpropagation comprise performing bounding box quantization on input values, the bounding box quantization converting values expressed utilizing different exponents to values expressed utilizing a common exponent, the values expressed utilizing the common exponent comprising only an identification of the common exponent, instead of the common exponent itself, the identification of the common exponent consuming fewer bits than the common exponent itself.

A second example is the method of the first example, wherein the performing the weight update also results in a storage of a second set of weight values in a full-precision format, the second set of weight values in the full-precision format being output by the performing the weight update utilizing the first set of weight values in the full-precision format and the first set of gradient values in the full-precision format.

A third example is the method of the second example, wherein the first set of weight values in the full-precision format utilized by the weight update are obtained from local storage where the first set of weight values in the full-precision format were stored by a prior performance of the weight update.

A fourth example is the method of the first example, wherein the performing the weight update comprises: performing stochastic rounding to convert a second set of weight values in a full-precision format to the second set of weight values in the reduced-precision format that are stored, the second set of weight values in the full-precision format being output by the performing the weight update utilizing the first set of weight values in the full-precision format and the first set of gradient values in the full-precision format.

A fifth example is the method of the fourth example, wherein the performing the weight update further comprises: receiving, as input to the weight update, the first set of gradient values in the first reduced-precision format; upconverting the first set of gradient values in the first reduced-precision format to the first set of gradient values in the full-precision format; receiving, as input to the weight update, the first set of weight values in the first reduced-precision format, the first set of weight values in the first reduced-precision format having been generated by a prior performance of the weight update; and upconverting the first set of weight values in the first reduced-precision format to the first set of weight values in the full-precision format.

A sixth example is the method of the first example, wherein the performing the weight update comprises: performing gradient descent utilizing the first set of gradient values in the full-precision format and the first set of weight values in the full-precision format.

A seventh example is the method of the first example, wherein the performing the forward propagation comprises: performing the bounding box quantization on the first set of weight values in the first reduced-precision format to generate a first set of weight values in a second reduced-precision format; performing the bounding box quantization on the first set of activation values in the first reduced-precision format to generate a first set of activation values in the second reduced-precision format; performing matrix multiplication utilizing the first set of weight values in the second reduced-precision format and the first set of activation values in the second reduced-precision format to generate a second set of activation values in an increased-precision format utilizing more bits to represent values than the first reduced-precision format.

An eighth example is the method of the seventh example, wherein at least one of the performing the bounding box quantization on the first set of weight values or the performing the bounding box quantization on the first set of activation values comprises performing stochastic rounding as part of the bounding box quantization.

A ninth example is the method of the first example, wherein the performing the backpropagation comprises: performing the bounding box quantization on the first set of weight values in the first reduced-precision format to generate a first set of weight values in a second reduced-precision format; performing the bounding box quantization on the first set of error values in the first reduced-precision format to generate a first set of error values in the second reduced-precision format; performing matrix multiplication utilizing the first set of weight values in the second reduced-precision format and the first set of error values in the second reduced-precision format to generate a second set of error values in an increased-precision format utilizing more bits to represent values than the first reduced-precision format.

A tenth example is the method of the ninth example, wherein at least one of the performing the bounding box quantization on the first set of weight values or the performing the bounding box quantization on the first set of error values comprises performing stochastic rounding as part of the bounding box quantization.

An eleventh example is the method of the first example, wherein the performing the backpropagation comprises: performing the bounding box quantization on the first set of activation values in the first reduced-precision format to generate a first set of activation values in a second reduced-precision format; performing the bounding box quantization on the first set of error values in the first reduced-precision format to generate a first set of error values in the second reduced-precision format; performing matrix multiplication utilizing the first set of activation values in the second reduced-precision format and the first set of error values in the second reduced-precision format to generate the first set of gradient values in an increased-precision format utilizing more bits to represent values than the first reduced-precision format.

A twelfth example is the method of the eleventh example, wherein at least one of the performing the bounding box quantization on the first set of activation values or the performing the bounding box quantization on the first set of error values comprises performing stochastic rounding as part of the bounding box quantization.

A thirteenth example is the method of the first example, wherein the first reduced-precision format utilizes less than 20 bits to represent each value.

A fourteenth example is the method of the first example, wherein the first reduced-precision format is a 16-bit brain floating-point format.

A fifteenth example is the method of the first example, wherein the full-precision format is a 32-bit single precision floating-point format.

A sixteenth example is one or more computing devices, comprising, in aggregate: multiple processing units comprising circuitry; and multiple computer-readable storage media comprising computer-executable instructions, which, when executed by at least some of the multiple processing units, cause the one or more computing devices to: perform a forward propagation of the neural network training that receives, as input, a first set of weight values in a first reduced-precision format and a first set of activation values in the first reduced-precision format, and that outputs, into storage, a second set of activation values in the first reduced-precision format; perform a backpropagation of the neural network training that receives, as input, a first set of weight values in the first reduced-precision format, a first set of error values in the first reduced-precision format and the first set of activation values in the first reduced-precision format, and that outputs, into storage, a first set of gradient values in the first reduced-precision format and a second set of error values in the first reduced-precision format; and perform a weight update of the neural network training utilizing a first set of weight values in a full-precision format and a first set of gradient values in the full-precision format, the performing the weight update resulting in a storage of a second set of weight values in the reduced-precision format; wherein the forward propagation and the backpropagation comprise performing bounding box quantization on input values, the bounding box quantization converting values expressed utilizing different exponents to values expressed utilizing a common exponent, the values expressed utilizing the common exponent comprising only an identification of the common exponent, instead of the common exponent itself, the identification of the common exponent consuming fewer bits than the common exponent itself.

A seventeenth example is the one or more computing devices of the sixteenth example, wherein the computer-executable instructions directed to performing the weight update comprise computer-executable instructions, which, when executed by at least some of the multiple processing units, cause the one or more computing devices to: store a second set of weight values in a full-precision format, the second set of weight values in the full-precision format being output by the performing the weight update utilizing the first set of weight values in the full-precision format and the first set of gradient values in the full-precision format.

An eighteenth example is the one or more computing devices of the sixteenth example, wherein the computer-executable instructions directed to performing the weight update comprise computer-executable instructions, which, when executed by at least some of the multiple processing units, cause the one or more computing devices to: perform stochastic rounding to convert a second set of weight values in a full-precision format to the second set of weight values in the reduced-precision format that are stored, the second set of weight values in the full-precision format being output by the performing the weight update utilizing the first set of weight values in the full-precision format and the first set of gradient values in the full-precision format.

A nineteenth example is the one or more computing devices of the sixteenth example, wherein the performing the bounding box quantization comprises performing stochastic rounding.

A twentieth example is one or more computer-readable storage media comprising computer-executable instructions, which, when executed, cause one or more computing devices to: perform a forward propagation of the neural network training that receives, as input, a first set of weight values in a first reduced-precision format and a first set of activation values in the first reduced-precision format, and that outputs, into storage, a second set of activation values in the first reduced-precision format; perform a backpropagation of the neural network training that receives, as input, a first set of weight values in the first reduced-precision format, a first set of error values in the first reduced-precision format and the first set of activation values in the first reduced-precision format, and that outputs, into storage, a first set of gradient values in the first reduced-precision format and a second set of error values in the first reduced-precision format; and perform a weight update of the neural network training utilizing a first set of weight values in a full-precision format and a first set of gradient values in the full-precision format, the performing the weight update resulting in a storage of a second set of weight values in the reduced-precision format; wherein the forward propagation and the backpropagation comprise performing bounding box quantization on input values, the bounding box quantization converting values expressed utilizing different exponents to values expressed utilizing a common exponent, the values expressed utilizing the common exponent comprising only an identification of the common exponent, instead of the common exponent itself, the identification of the common exponent consuming fewer bits than the common exponent itself As can be seen from the above descriptions, mechanisms for training neural networks with decreased memory consumption and processor utilization have been presented. In view of the many possible variations of the subject matter described herein, we claim as our invention all such embodiments as may come within the scope of the following claims and equivalents thereto.

The invention claimed is:

1. A method of training a neural network, comprising:
receiving a first set of weight values in a first reduced-precision format and a first set of activation values in the first reduced-precision format;
performing a forward propagation step of training the neural network using the first set of weight values and the first set of activation values;
outputting a second set of activation values in the first reduced-precision format;
performing a backpropagation step of training the neural network using the first set of weight values and the first set of activation values, and a first set of error values in the first reduced-precision format;
outputting a first set of gradient values in the first reduced-precision format and a second set of error values in the first reduced-precision format;
performing a weight update step of training the neural network using a first set of weight values in a full-precision format and a first set of gradient values in the full-precision format; and
outputting a second set of weight values in the first reduced-precision format.

2. The method of claim 1, wherein the forward propagation step and the backpropagation step comprise performing bounding box quantization on input values.

3. The method of claim 2, wherein the bounding box quantization comprises converting values expressed utilizing different exponents to values expressed utilizing a common exponent, the values expressed utilizing the common exponent comprising an identification of the common exponent, but not the common exponent itself, the identification of the common exponent consuming fewer bits than the common exponent itself.

4. The method of claim 2, wherein the performing the forward propagation step comprises:

performing the bounding box quantization on the first set of weight values in the first reduced-precision format to generate a first set of weight values in a second reduced-precision format;

performing the bounding box quantization on the first set of activation values in the first reduced-precision format to generate a first set of activation values in the second reduced-precision format; and performing matrix multiplication utilizing the first set of weight values in the second reduced-precision format and the first set of activation values in the second reduced-precision format to generate a second set of activation values in an increased-precision format utilizing more bits to represent values than the first reduced-precision format.

5. The method of claim 4, wherein one or more of performing the bounding box quantization on the first set of weight values and performing the bounding box quantization on the first set of activation values comprises performing stochastic rounding as part of the bounding box quantization.

6. The method of claim 2, wherein the performing the backpropagation step comprises:
performing the bounding box quantization on the first set of weight values in the first reduced-precision format to generate a first set of weight values in a second reduced-precision format;
performing the bounding box quantization on the first set of error values in the first reduced-precision format to generate a first set of error values in the second reduced-precision format; and
performing matrix multiplication utilizing the first set of weight values in the second reduced-precision format and the first set of error values in the second reduced-precision format to generate a second set of error values in an increased-precision format utilizing more bits to represent values than the first reduced-precision format.

7. The method of claim 6, wherein one or more of performing the bounding box quantization on the first set of weight values and performing the bounding box quantization on the first set of error values comprises performing stochastic rounding as part of the bounding box quantization.

8. The method of claim 2, wherein the performing the backpropagation step comprises:
performing the bounding box quantization on the first set of activation values in the first reduced-precision format to generate a first set of activation values in a second reduced-precision format;
performing the bounding box quantization on the first set of error values in the first reduced-precision format to generate a first set of error values in the second reduced-precision format; and
performing matrix multiplication utilizing the first set of activation values in the second reduced-precision format and the first set of error values in the second reduced-precision format to generate the first set of gradient values in an increased-precision format utilizing more bits to represent values than the first reduced-precision format.

9. The method of claim 1, further comprising, responsive to performing the weight update step, outputting a second set of weight values in the full-precision format.

10. The method of claim 9, wherein the first set of weight values in the full-precision format utilized in performing the weight update step were stored in a local storage following a prior performance of the weight update.

11. The method of claim 1, wherein the performing the weight update step further comprises:
performing stochastic rounding to convert a second set of weight values in the full-precision format to the second set of weight values in the first reduced-precision format.

12. The method of claim 11, wherein the second set of weight values in the full-precision format were output by the performing the weight update step using the first set of weight values in the full-precision format and the first set of gradient values in the full-precision format.

13. One or more computing devices, comprising, in aggregate:
multiple processing units comprising circuitry; and
multiple computer-readable storage media comprising computer-executable instructions, which, when executed by at least some of the multiple processing units, cause the one or more computing devices to:
receive a first set of weight values in a first reduced-precision format and a first set of activation values in the first reduced-precision format;
perform a forward propagation step of training a neural network using the first set of weight values and the first set of activation values;
output a second set of activation values in the first reduced-precision format;
perform a backpropagation step of training the neural network using the first set of weight values and the first set of activation values, and a first set of error values in the first reduced-precision format;
output a first set of gradient values in the first reduced-precision format and a second set of error values in the first reduced-precision format;
perform a weight update step of training the neural network using a first set of weight values in a full-precision format and a first set of gradient values in the full-precision format; and
output a second set of weight values in the first reduced-precision format.

14. The one or more computing devices of claim 13, wherein the forward propagation step and the backpropagation step comprise performing bounding box quantization on input values.

15. The one or more computing devices of claim 14, wherein the bounding box quantization comprises converting values expressed utilizing different exponents to values expressed utilizing a common exponent, the values expressed utilizing the common exponent comprising an identification of the common exponent, but not the common exponent itself, the identification of the common exponent consuming fewer bits than the common exponent itself.

16. The one or more computing devices of claim 13, wherein the computer-executable instructions further comprise instructions, which, when executed by at least some of the multiple processing units, cause the one or more computing devices to:
store a second set of weight values in the full-precision format, the second set of weight values in the full-precision format being output by the performing the weight update step using the first set of weight values in the full-precision format and the first set of gradient values in the full-precision format.

17. One or more computer-readable storage media comprising computer-executable instructions, which, when executed, cause one or more computing devices to:

receive a first set of weight values in a first reduced-precision format and a first set of activation values in the first reduced-precision format;

perform a forward propagation step of training a neural network using the first set of weight values and the first set of activation values;

output a second set of activation values in the first reduced-precision format;

perform a backpropagation step of training the neural network using the first set of weight values and the first set of activation values, and a first set of error values in the first reduced-precision format;

output a first set of gradient values in the first reduced-precision format and a second set of error values in the first reduced-precision format;

perform a weight update step of training the neural network using a first set of weight values in a full-precision format and a first set of gradient values in the full-precision format; and output a second set of weight values in the first reduced-precision format.

18. The one or more computer-readable storage media comprising computer-executable instructions of claim 17, wherein the forward propagation step and the backpropagation step comprise performing bounding box quantization on input values.

19. The one or more computer-readable storage media comprising computer-executable instructions of claim 18, wherein the bounding box quantization comprises converting values expressed utilizing different exponents to values expressed utilizing a common exponent, the values expressed utilizing the common exponent comprising an identification of the common exponent, but not the common exponent itself, the identification of the common exponent consuming fewer bits than the common exponent itself.

20. The one or more computer-readable storage media comprising computer-executable instructions of claim 17, wherein the computer-executable instructions further comprise instructions, which, when executed by at least some of the multiple processing units, cause the one or more computing devices to:

store a second set of weight values in the full-precision format, the second set of weight values in the full-precision format being output by the performing the weight update step using the first set of weight values in the full-precision format and the first set of gradient values in the full-precision format.

* * * * *